(12) United States Patent
Tojima et al.

(10) Patent No.: US 10,488,867 B2
(45) Date of Patent: Nov. 26, 2019

(54) MINING MACHINE MANAGEMENT SYSTEM, MINING MACHINE, AND MANAGEMENT METHOD

(71) Applicant: Komatsu Ltd., Tokyo (JP)

(72) Inventors: Masanori Tojima, Fujisawa (JP); Mitsuhiro Ryuman, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 88 days.

(21) Appl. No.: 15/107,198

(22) PCT Filed: Dec. 27, 2013

(86) PCT No.: PCT/JP2013/085264
§ 371 (c)(1),
(2) Date: Jun. 22, 2016

(87) PCT Pub. No.: WO2015/097909
PCT Pub. Date: Jul. 2, 2015

(65) Prior Publication Data
US 2017/0031367 A1 Feb. 2, 2017

(51) Int. Cl.
G05D 1/02 (2006.01)
G01C 21/16 (2006.01)
(Continued)

(52) U.S. Cl.
CPC ......... *G05D 1/0257* (2013.01); *G01C 21/165* (2013.01); *G01S 13/931* (2013.01);
(Continued)

(58) Field of Classification Search
CPC .... G05D 1/0257; G05D 1/0261; G05D 1/027; G05D 1/0274; G05D 2201/021;
(Continued)

(56) References Cited

U.S. PATENT DOCUMENTS 7,274,166 B2  9/2007 Kim
8,880,342 B2  11/2014 Ando et al.
(Continued)

FOREIGN PATENT DOCUMENTS

CN  1617186 A  5/2005
CN  1636685 A  7/2005
(Continued)

OTHER PUBLICATIONS

Office Action dated Jun. 21, 2017, issued for the corresponding Australian patent application No. 2013408997.
(Continued)

Primary Examiner — Hunter B Lonsberry
Assistant Examiner — Mathew Franklin Gordon
(74) Attorney, Agent, or Firm — Locke Lord LLP

(57) ABSTRACT

A mining machine management system includes a detection unit mounted on a mining machine that travels in a mine in which a plurality of landmarks is installed, and configured to detect a position of the landmark with respect to the mining machine in a non-contact manner, an own position detection device mounted on the mining machine, and configured to obtain an own position of the mining machine, a storage unit configured to store positions of the plurality of landmarks, the positions having been obtained in advance, as registration positions, and a processing unit configured to obtain the position of the landmark detected by the detection unit from a detection result of the detection unit and the own position, and read the registration position corresponding to the landmark from the storage unit and obtain position deviation between the registration position and the position of the landmark.

10 Claims, 13 Drawing Sheets

(51) Int. Cl.
*G01S 13/93* (2006.01)
*G01S 19/48* (2010.01)

(52) U.S. Cl.
CPC .............. *G01S 19/48* (2013.01); *G05D 1/027* (2013.01); *G05D 1/0274* (2013.01); *G05D 2201/021* (2013.01)

(58) Field of Classification Search
CPC ....... G01C 21/165; G01S 7/411; G01S 13/86; G01S 13/931; G01S 19/48; G01S 7/412; G01S 13/42; G01S 13/87; G01S 2013/9339; G01S 2013/9353; G01S 2013/9357; G01S 2013/936; G01S 2013/9375; G01S 2013/9378; G01S 2013/9385
See application file for complete search history.

(56) References Cited

U.S. PATENT DOCUMENTS

| | | | |
|---|---|---|---|
| 8,972,094 | B2 | 3/2015 | Itoi et al. |
| 9,105,137 | B2 | 8/2015 | Itoi et al. |
| 2002/0099481 | A1 | 7/2002 | Mori |
| 2005/0075784 | A1 | 4/2005 | Gray et al. |
| 2005/0102096 | A1 | 5/2005 | Min et al. |
| 2005/0134209 | A1 | 6/2005 | Kim |
| 2009/0030551 | A1* | 1/2009 | Hein ...................... G05D 1/024 700/253 |
| 2010/0063680 | A1 | 3/2010 | Tolstedt et al. |
| 2011/0004402 | A1* | 1/2011 | Fouet ...................... G01S 13/86 701/408 |
| 2011/0282622 | A1 | 11/2011 | Canter |
| 2012/0299702 | A1* | 11/2012 | Edara ...................... G01S 19/49 340/8.1 |
| 2013/0245936 | A1 | 9/2013 | Ando et al. |
| 2013/0285842 | A1* | 10/2013 | Ramin ................. G09B 21/006 340/994 |
| 2014/0229055 | A1 | 8/2014 | Itoi et al. |
| 2014/0297091 | A1 | 10/2014 | Itoi et al. |
| 2014/0358382 | A1 | 12/2014 | Kou et al. |

FOREIGN PATENT DOCUMENTS

| | | |
|---|---|---|
| CN | 103202035 A | 7/2013 |
| CN | 103210153 A | 7/2013 |
| CN | 103308050 A | 9/2013 |
| JP | 2002-215236 A | 7/2002 |
| JP | 2013-196051 A | 9/2013 |

OTHER PUBLICATIONS

International Search Report dated Feb. 25, 2014, issued for PCT/JP2013/085264.

Robertson, P., Introduction to SLAM Simultaneous Localization and Mapping, Cognitive Robotics, Feb. 9, 2005, pp. 1-37, cited in corresponding Australian Patent Application No. 2013408997.

* cited by examiner

MINING MACHINE MANAGEMENT SYSTEM, MINING MACHINE, AND MANAGEMENT METHOD

CROSS REFERENCE TO RELATED APPLICATIONS

This application is related to co-pending application: "MINING MACHINE MANAGEMENT SYSTEM AND MANAGEMENT METHOD" filed even date herewith in the names of Masanori TOJIMA and Mitsuhiro RYUMAN as a national phase entry of PCT/JP2013/085256 filed Dec. 27, 2013 and "MANAGEMENT SYSTEM AND MANAGING METHOD OF MINING MACHINE" filed on Jun. 21, 2016, U.S. Ser. No. 15/106,902, in the names of Masanori TOJIMA and Mitsuhiro RYUMAN as a national phase entry of PCT/JP2013/085258 filed Dec. 27, 2013, which application is assigned to the assignee of the present application and is incorporated by reference herein.

FIELD

The present invention relates to a mining machine management system, a mining machine, and a management method.

BACKGROUND

In mines, causing unmanned vehicles to automatically travel in a traveling path set in advance has been proposed (for example, Patent Literature 1).

CITATION LIST

Patent Literature

Patent Literature 1: Japanese Laid-open Patent Publication No. 2002-215236

SUMMARY

Technical Problem

Patent Literature 1 describes, in causing an unmanned vehicle to automatically travel, use of navigation to reckon a position and an azimuth of the vehicle by obtaining a traveling distance of the vehicle using a speed sensor or a moving distance sensor, and estimating the azimuth using a gyro or a geomagnetic sensor. In a case of causing a mining machine to travel with such navigation, an error of the position of the mining machine to be reckoned becomes larger as the traveling distance becomes larger. Therefore, in the case of causing a mining machine to travel with the navigation, correction of the error of the reckoned position using a reference of position called landmark installed in GPS or a mine is considered.

In a case where the GPS becomes unable to be used, the mining machine is caused to travel while the position obtained by the navigation is corrected using the position of the landmark. In this case, the landmark installed in the mine may be moved. Then, the position obtained by the navigation is corrected using the landmark in the position deviating from the original position. As a result, in a case of an unmanned mining machine, there is a possibility that the mining machine deviates from a traveling path in the mine. The same applies to a case of guiding a manned mining machine using a navigation device, for example.

An objective of the present invention is to provide a mining machine management system and a management method that can decrease a possibility that a mining machine deviates from a traveling path in a mine.

Solution to Problem

According to the present invention, a mining machine management system comprises: a detection unit mounted on a mining machine that travels in an unmanned manner in a mine in which a plurality of landmarks is installed, the detection unit being configured to detect a position of the landmark with respect to the mining machine in a non-contact manner; an own position detection device mounted on the mining machine, the own position detection device being configured to obtain an own position of the mining machine; a storage unit configured to store positions of the plurality of landmarks, the positions having been obtained in advance, as registration positions; and a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark.

It is preferable that the processing unit corrects a current position of the mining machine based on the position of the landmark obtained in advance and the position of the landmark detected by the detection unit to cause the mining machine to travel by dead reckoning navigation, and causes the mining machine to travel by the dead reckoning navigation without using the registration position corresponding to the landmark having the position deviation larger than a predetermined threshold.

It is preferable that the storage unit stores, when the position deviation obtained by the processing unit is larger than a predetermined threshold, information about the position deviation being larger than the predetermined threshold.

It is preferable that the processing unit corrects a current position of the mining machine based on the position of the landmark obtained in advance and the position of the landmark detected by the detection unit to cause the mining machine to travel by the dead reckoning navigation, and causes the mining machine to travel by the dead reckoning navigation without using the registration position corresponding to the landmark having the position deviation larger than the predetermined threshold.

It is preferable that the storage unit rewrites, when the position deviation obtained by the processing unit is larger than a predetermined threshold, the registration position with the position of the landmark obtained by the processing unit, and the processing unit corrects a current position of the mining machine based on the position of the landmark obtained in advance and the position of the landmark detected by the detection unit to cause the mining machine to travel by dead reckoning navigation, and causes the mining machine to travel by the dead reckoning navigation using the rewritten registration position.

According to the present invention, a mining machine management system comprises: a detection unit mounted on a mining machine that travels in an unmanned manner in a mine in which a plurality of landmarks is installed, the detection unit being configured to detect the landmark with respect to the mining machine in a non-contact manner; an own position detection device mounted on the mining machine, the own position detection device being configured to obtain an own position of the mining machine; a storage unit configured to store positions of the plurality of landmarks, the positions having been obtained in advance, as registration positions; and a processing unit configured to obtain the position of the landmark detected by the detection unit from a detection result of the detection unit and the own position obtained by the own position detection device, read the registration position corresponding to the landmark from the storage unit and obtain position deviation between the registration position and the position of the landmark, and transmit the obtained position of the landmark to the storage unit, wherein, when the position deviation is larger than a predetermined threshold, information about the position deviation being larger than the predetermined threshold is stored in the storage unit, and the processing unit transmits the information to another mining machine operated in the mine.

According to the present invention, a mining machine that travels in an unmanned manner in a mine in which a plurality of landmarks is installed, the mining machine comprises: a detection unit configured to detect a position of the landmark with respect to the mining machine in a non-contact manner; an own position detection device mounted on the mining machine, the own position detection device being configured to obtain an own position of the mining machine; a storage unit configured to store positions of the plurality of landmarks, the positions having been obtained in advance, as registration positions; and a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark.

It is preferable that the processing unit corrects a current position of the mining machine based on the position of the landmark obtained in advance and the position of the landmark detected by the detection unit to cause the mining machine to travel by dead reckoning navigation, and causes the mining machine to travel by the dead reckoning navigation without using the registration position corresponding to the landmark having the position deviation larger than a predetermined threshold.

It is preferable that the storage unit stores, when the position deviation obtained by the processing unit is larger than a predetermined threshold, information about the position deviation being larger than the predetermined threshold.

According to the present invention, a mining machine management method, in managing a mining machine that travels in an unmanned manner in a mine in which a plurality of landmarks is installed, the mining machine management method comprises: detecting a position of the landmark with respect to the mining machine and an own position of the mining machine; obtaining the position of the landmark from a detection result of the position of the landmark and the own position, and obtaining position deviation between a position of a landmark corresponding to the landmark, the position having been obtained in advance, and the obtained position of the landmark; and generating, when the obtained position deviation is larger than a predetermined threshold, information about the position deviation being larger than the predetermined threshold.

The present invention can decrease a possibility of deviation of a mining machine from a traveling path in a mine.

DESCRIPTION OF EMBODIMENTS

Forms (embodiments) for implementing the present invention will be described in detail with reference to the drawings.

<Outline of Mining Machine Management System>

Figure 1:
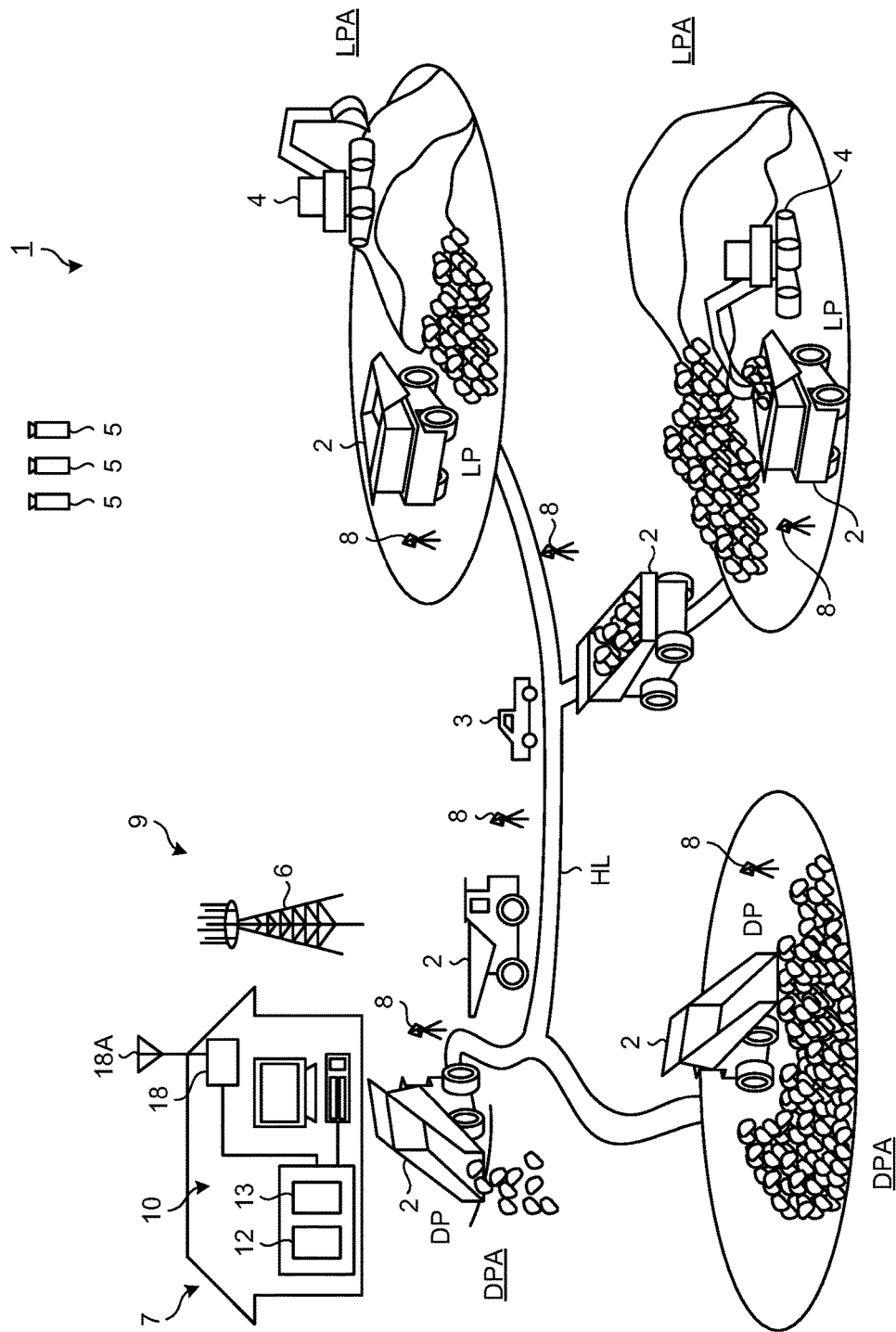
FIG. 1 is a diagram illustrating an example of a mining machine management system according to the present embodiment.

FIG. 1 is a diagram illustrating an example of a mining machine management system 1 according to the present embodiment. FIG. 1 schematically illustrates the mining machine management system (hereinafter, appropriately, referred to as management system) 1 and a site to which the management system 1 is applied. The management system 1 includes a management device 10 arranged in a control facility 7, and manages mining machines. Management of mining machines includes at least one of traffic control of the mining machines, evaluation of productivity of the mining machines, evaluation of operation techniques of operators of the mining machines, maintenance of the mining machines, and diagnosis of abnormality of the mining machines.

The mining machine is a collective term of machinery used for various types of work in mines. The mining machines are, for example, a loading machine, a carrying machine, and the like. The loading machine is a machine that loads a load such as gravels or rocks onto the carrying machine. The loading machine includes at least one of an excavator, electric excavator, and a wheel loader. The carrying machine is machine that travels in mines and carries the loads loaded by the loading machine. The carrying machine includes a dump truck 2.

In the present embodiment, the management system 1 manages at least the carrying machine. Hereinafter, an example in which the management system 1 manages the dump truck 2 will be described. However, an object managed by the management system 1 is not limited to the dump truck 2. The dump truck 2 travels in at least a part of a loading place LPA of a mine, a dumping place DPA, and a conveying path HL as a traveling path passing to at least one of the loading place LPA and the dumping place DPA. As described above, the dump truck 2 is a moving body movable in the mine.

In the present embodiment, the dump truck 2 is a so-called unmanned dump truck that is operated by a command from the management device 10. Therefore, no worker (operator) boards the dump truck 2. Note that the dump truck 2 is not limited to the unmanned dump truck, and may be a manned dump truck boarded and driven by the worker. In the present embodiment, the dump truck 2 travels according to a traveling path determined in advance. In the present embodiment, the dump truck 2 controls own steering, accelerator, and brake along the set traveling path based on an own position during operation and position information included in the traveling path.

The dump truck 2 is loaded by a loading machine 4 in a loading position LP in the loading place LPA. The loading place LPA is a region where loading work of a load is performed in the mine. The loading position LP is a position (loading point) where the dump truck 2 is actually loaded in the loading place LPA spread to a predetermined range.

The dump truck 2 is unloaded in the dumping place DPA. To be specific, the dump truck 2 raises a loaded vessel, and discharges the load from the vessel into the dumping place DPA. The dumping place DPA is a region where the dump truck 2 discharges the load in the mine. A dumping position DP is a place where the dump truck 2 actually discharges the load in the dumping place DPA spread to a predetermined range.

In the present embodiment, the management system 1 illustrated in FIG. 1 includes at least the dump truck 2. In the present embodiment, the management system 1 can be realized by the dump truck 2, and the management device 10 arranged in the control facility 7, and which manages the dump truck 2.

In the mine, a vehicle 3 as a moving body movable in the mine travels, in addition to the dump truck 2. The vehicle 3 travels in the mine to perform various types of work related to the mine including management and maintenance of the mining machines used in the mine. In the present embodiment, the vehicle 3 travels in at least a part of the loading place LPA, the dumping place DPA, and the conveying path HL. The vehicle 3 is driven by the worker (operator) who boards thereon. As described above, the vehicle 3 is a so-called manned vehicle. The worker boarding on the vehicle 3 moves to an arbitrary position in the mine together by the vehicle 3. In the present embodiment, the vehicle 3 is a pickup truck or an automobile, for example.

The management device 10 is installed in the control facility (central control room) 7 of the mine. In the present embodiment, the management device 10 is not moved. However, the management device 10 may be moved.

A plurality of landmarks 8 is installed in the mine. The landmarks 8 are respectively arranged in the loading place LPA, the dumping place DPA, and the conveying path HL. Since the landmarks 8 are stationary objects, the landmarks 8 are not moved from the installed positions (places) in principle.

The dump truck 2 travels while successively updating an own position using azimuth angle measurement by a gyro and a speed (hereinafter, appropriately referred to as vehicle speed) at which the dump truck 2 travels. A method like this is referred to as dead reckoning navigation or autonomous navigation. The dead reckoning navigation accumulates errors. Therefore, in the dead reckoning navigation, for example, the own position is corrected using the position of the dump truck that is measured using a global positioning system (GPS). In a case where the GPS cannot be used, the dump truck 2 acquires the position of the landmark 8 and corrects the own position. Note that the own position may be corrected by the management device 10.

A communication system 9 transmits information between the management device 10 and the dump truck 2 and between the management device 10 and the vehicle 3. Therefore, the management device 10 and the dump truck 2, and the management device 10 and the vehicle 3 can perform communication through the communication system 9. In the present embodiment, the communication system may transmit information between the vehicle 3 and the dump truck 2. In this case, the dump truck 2 and the vehicle 3 can perform communication through the communication system 9. In the present embodiment, the communication system 9 is, but not limited to, a wireless communication system. In the present embodiment, the communication system 9 includes a repeater 6 that relays a signal (radio wave) between the management device 10 and the dump truck 2, and between the management device 10 and the vehicle 3.

In the present embodiment, the position of the dump truck 2, the position of the vehicle 3, and the position of the landmark 8 are obtained using the GPS. The GPS includes a GPS satellite 5. The GPS detects a position in a coordinate system (GPS coordinate system) that defines latitude, longitude, and altitude. Therefore, the position detected by the GPS includes coordinate values of the latitude, longitude, and altitude. The position detected by the GPS is an absolute position defined in the GPS coordinate system. In the description below, the position measured by the GPS is appropriately referred to as GPS position.

<Management Device>

Figure 2:
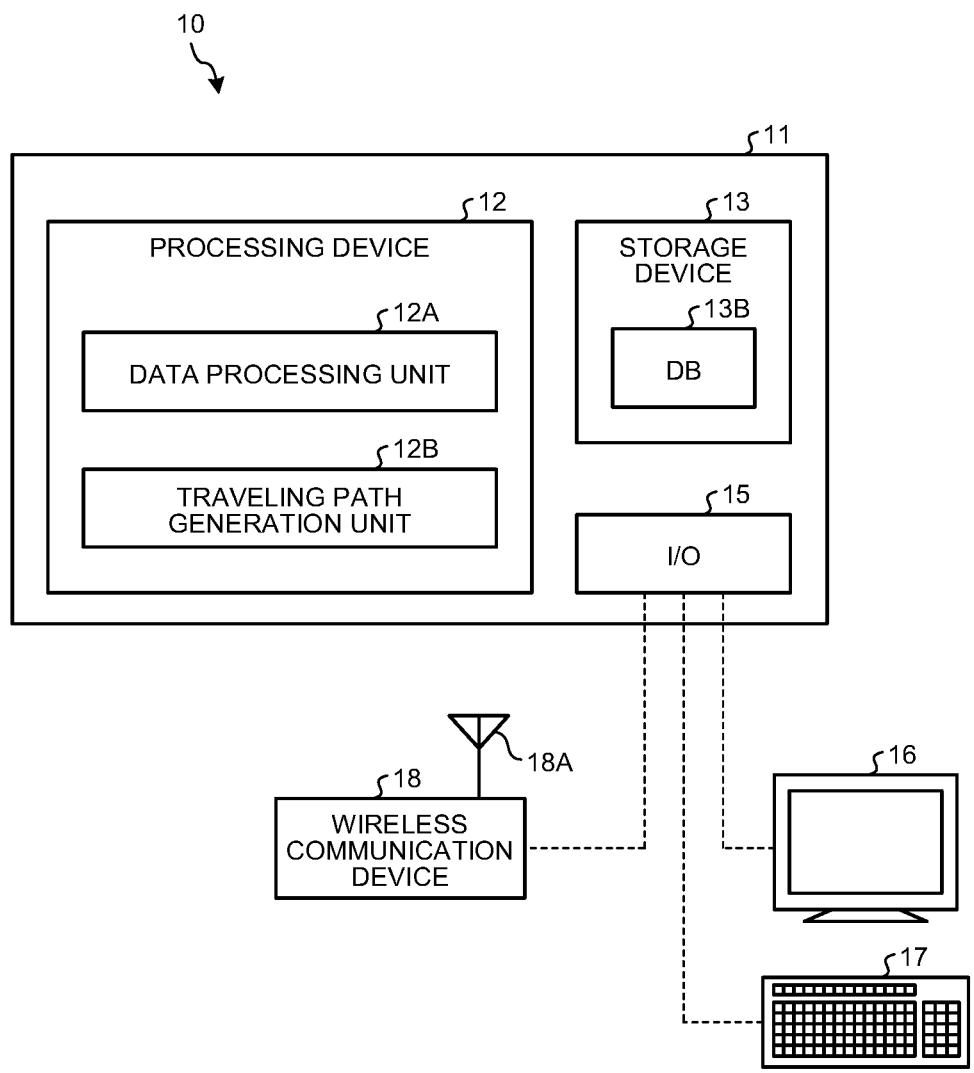
FIG. 2 is a block diagram illustrating an example of a management device according to the present embodiment.

FIG. 2 is a block diagram illustrating an example of the management device 10 according to the present embodiment. As illustrated in FIG. 2, the management device 10 includes a computer system 11, a display device 16, an input device 17, and a wireless communication device 18. The computer system 11 includes a processing device 12 as a processing unit, a storage device 13 as a storage unit, and an input/output unit 15. The display device 16, the input device 17, and the wireless communication device 18 are connected with the computer system 11 through an input/output unit 15. The input/output unit 15 is used to input/output information to/from at least one of the processing device 12, the display device 16, the input device 17, and the wireless communication device 18.

The processing device 12 includes a central processing unit (CPU), for example. The processing device 12 executes various types of processing related to management of the dump truck 2. The processing device 12 includes a data processing unit 12A and a traveling path generation unit 12B. In the present embodiment, the data processing unit 12A processes information related to the position of the dump truck 2, information related to the position of the vehicle 3, and information related to the position of the landmark 8, which are acquired through the communication system 9. The traveling path generation unit 12B generates a traveling path on which the dump truck 2 travels. The dump truck 2 travels along the travel path generated by the traveling path generation unit 12B in at least a part of the loading place LPA, the dumping place DPA, and the conveying path HL. The traveling path generated by the traveling path generation unit 12B is a position information group that includes a plurality of coordinate values of the latitude, longitude, and altitude as position information.

The storage device 13 is a random access memory (RAM), a read only memory (ROM), an erasable programmable read only memory (EPROM), an electrically erasable programmable read-only memory (EEPROM), a hard disk drive, or combinations thereof. The storage device 13 stores various types of information related to management of the dump truck 2. The storage device 13 includes a database 13B in which information is registered. Further, the storage device 13 stores a computer program for causing the processing device 12 to execute various types of processing. The processing device 12 reads the computer program stored in the storage device 13, and processes the information related to the positions and generates the traveling path.

The display device 16 displays the information related to the position of the dump truck 2, the information related to the position of the vehicle 3, the information related to the position of the landmark 8, and the like. The display device 16 includes, for example, a flat panel display such as a liquid crystal display.

The input device 17 includes at least one of a keyboard, a touch panel, an operation switch, and a mouse. The input device 17 functions as an operation unit that can input an operation signal to the processing device 12. An administrator of the control facility 7 can operate the input device 17 to input a command, information, and the like to the processing device 12.

The communication system 9 includes the wireless communication device 18. The wireless communication device 18 is arranged in the control facility 7. The wireless communication device 18 is connected with the processing device 12 through the input/output unit 15. The wireless communication device 18 includes an antenna 18A. The wireless communication device 18 can receive information transmitted from at least one of the dump truck 2 and the vehicle 3. The wireless communication device 18 outputs the received information to the processing device 12. The information received by the wireless communication device 18 is stored (registered) in the storage device 13. The wireless communication device 18 transmits the information to at least one of the dump truck 2 and the vehicle 3.

<Dump Truck>

Figure 3:
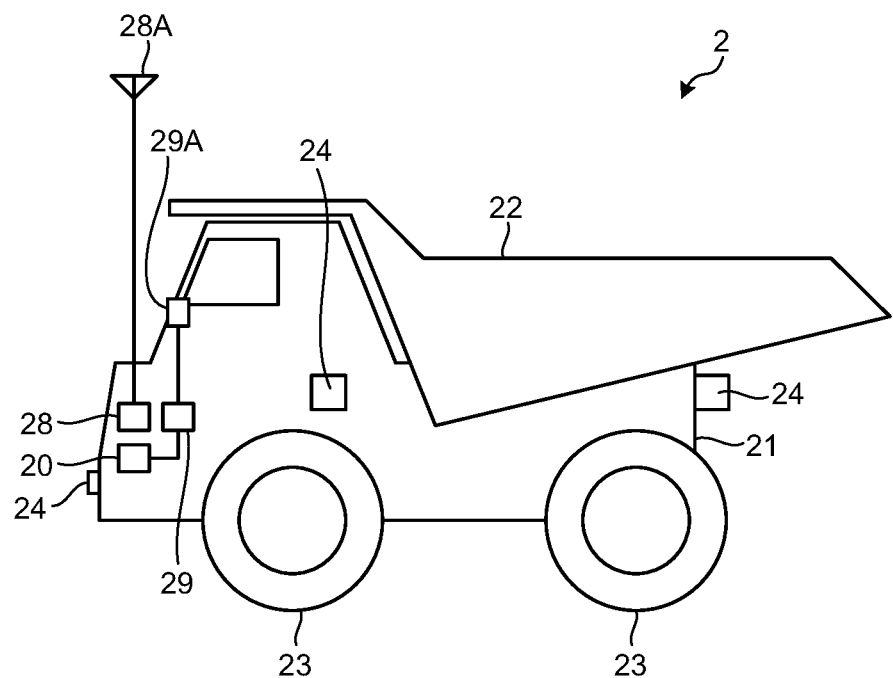
FIG. 3 is a diagram illustrating a dump truck according to the present embodiment.
Figure 4:
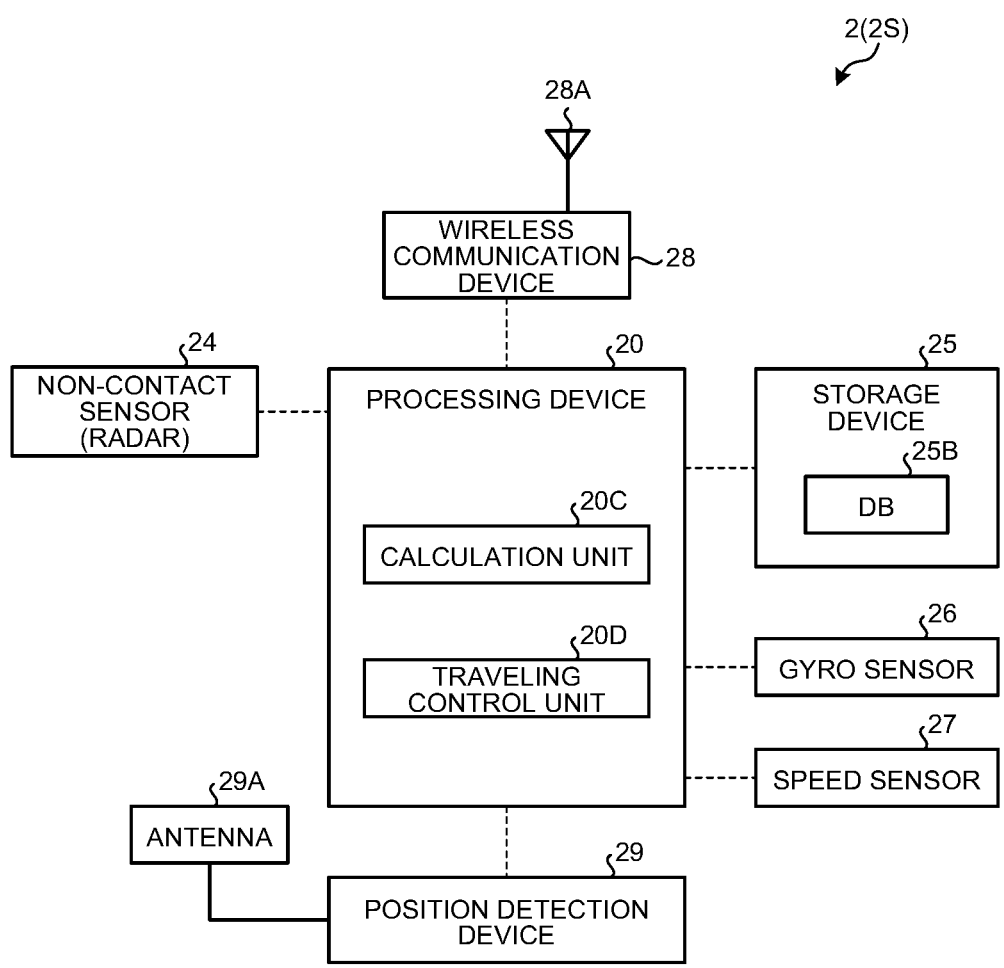
FIG. 4 is a block diagram illustrating a control system of the dump truck according to the present embodiment.

FIG. 3 is a diagram illustrating the dump truck 2 according to the present embodiment. FIG. 4 is a block diagram illustrating a control system of the dump truck 2 according to the present embodiment. As illustrated in FIGS. 3 and 4, the dump truck 2 includes a vehicle main body 21, a vessel 22, wheels 23, a non-contact sensor 24 as a detection unit that detects the position of the landmark 8 in a non-contact manner, a processing device 20 as a processing unit, a storage device 25 as a storage unit, a gyro sensor 26, a speed sensor 27, a wireless communication device 28 to which an antenna 28A is connected, and a position detection device 29 as an own position detection device to which an antenna 29A is connected.

An internal combustion engine, a generator, and a motor are mounted on the vehicle main body 21, for example. In the present embodiment, the internal combustion engine is a diesel engine, for example. The generator is driven by the internal combustion engine and generates power. The motor drives the wheels 23, to be specific, rear wheels, by the power generated by the generator, and allows the dump truck 2 to travel. The wheels 23 include tires and wheels. A driving system of the dump truck 2 is not limited to such a system. For example, the driving system of the dump truck 2 may be a drive system in which the power of the internal combustion engine is transmitted to the wheels 23 through a transmission including a torque converter.

A vessel 22 is a load-carrying platform that is loaded. The vessel 22 is arranged on the vehicle main body 21. The vessel 22 is loaded by the loading machine 4. The vessel 22 can take a horizontal first posture and a second posture rising from a rear end side of the dump truck 2 as a point of support. The first posture is a state where the vessel 22 is loaded, and the second posture is a posture at which the vessel 22 is unloaded.

A plurality of the non-contact sensors 24 is arranged around the vehicle main body 21. The non-contact sensor 24 includes a radar device that detects an object existing around the dump truck 2, for example. The radar device included in the non-contact sensor 24 is a device that detects the object using a millimeter wave radar in a non-contact manner. In the present embodiment, the non-contact sensor 24 can obtain the distance and the azimuth to the detected object, and a relative position between the detected object and the own device from the obtained distance and azimuth.

The non-contact sensor 24 may output a signal according to reflection intensity of a radio wave reflected by the object and a direction of the reflected radio wave. In this case, the processing device 20 that has acquired the signal from the non-contact sensor 24 obtains the distance and the azimuth to the object detected by the non-contact sensor 24, and obtains the relative position between the detected object and the non-contact sensor 24 from the obtained distance and azimuth, based on the reflection intensity and the direction of the radio wave corresponding to the acquired signal. That is, the non-contact sensor 24 and the processing device 20 function as a detection unit.

The non-contact sensor 24 includes an emission unit that can emit the radio wave, and a reception unit that can receive the radio wave. In the present embodiment, the position of the landmark 8 installed in the mine is detected in a non-contact manner using the non-contact sensor 24 used for monitoring surroundings of the dump truck 2. In doing so, it is not necessary to separately provide sensors for detecting the position of the landmark 8. Therefore, manufacturing cost of the dump truck 2 can be decreased.

When detecting the landmark 8 and its position, the non-contact sensor 24 emits the radio wave, and irradiates the landmark 8 with the radio wave. At least a part of the radio wave with which the landmark 8 is irradiated is reflected at the landmark 8. The non-contact sensor 24 receives the radio wave reflected at the landmark 8. In doing so, the non-contact sensor 24 can detect the landmark 8 for the non-contact sensor 24, and can detect the direction, the distance, and the position of the detected landmark 8.

The non-contact sensor 24 is attached to the vehicle main body 21 of the dump truck 2. Therefore, the relative position of the landmark 8 with respect to the dump truck 2, which has been detected by the non-contact sensor 24, corresponds to the position (relative position, hereinafter, appropriately referred to as relative position) of the landmark 8 to the dump truck 2.

The non-contact sensor 24 is connected to the processing device 20. The non-contact sensor 24 converts a detection result of detection of the landmark 8, a vehicle existing around the dump truck 2, or another object into an electrical signal, and outputs the signal to the processing device 20. This detection result includes the direction, the distance, and the position of the landmark 8. The processing device 20 obtains the relative position between the dump truck 2 and the landmark 8 based on the detection result of the non-contact sensor 24. That is, the non-contact sensor 24 detects the relative position of the landmark 8 with respect to the own sensor, so that the relative position between the dump truck 2 and the landmark 8 is detected.

The non-contact sensors 24 are arranged on a front surface, a rear surface, and both side surfaces of the vehicle main body of the dump truck 2. In the embodiment described below, the non-contact sensor 24 detects a front object (for example, the landmark 8) at the time of traveling nearly straight, and thus description will be exemplarily given using the front non-contact sensor 24. In a case of traveling rearward, the dump truck 2 can detect an object by the rear non-contact sensor 24. An object existing in front of a curve can be detected by the side non-contact sensor 24. Each of the non-contact sensors 24 obtains at least one of the distance and the azimuth of the object. The processing device 20 detects the relative position between the dump truck 2 and the object considering the detection result of each of the non-contact sensors 24, and an attached position and an attaching direction of each of the non-contact sensors 24 in the vehicle main body.

The gyro sensor 26 detects the azimuth (for example, an azimuth change amount) of the dump truck 2. The gyro sensor 26 is connected with the processing device 20, converts the detection result into the electrical signal, and outputs the signal to the processing device 20. The processing device 20 obtains the azimuth (azimuth change amount) of the dump truck 2 based on the detection result of the gyro sensor 26.

The speed sensor 27 detects a vehicle speed of the dump truck 2. In the present embodiment, the speed sensor 27 detects a rotation speed of the wheels 23 to detect the vehicle speed of the dump truck 2. The speed sensor 27 is connected with the processing device 20, converts a detection result into an electrical signal, and outputs the signal to the processing device 20. The processing device 20 can obtain a moving speed of the dump truck 2 based on the detection result of the speed sensor 27 and time information from a timer built in the processing device 20.

<Control System of Dump Truck>

The processing device 20 included in a processing system 2S of the dump truck 2 illustrated in FIG. 4 includes a central processing unit (CPU). The processing device 20 executes various types of processing related to management, control, and the like of the dump truck 2. In the present embodiment, the processing device 20 can execute processing equivalent to that of the processing device 12 arranged in the control facility 7. The processing device 20 includes a calculation unit 20C and a traveling control unit 20D.

The calculation unit 20C obtains the position of the landmark 8 detected by the non-contact sensor 24 from the detection result of the non-contact sensor 24 and the own position of the dump truck 2 obtained by the position detection device 29. As described below, since the own position of the dump truck 2 obtained by the position detection device 29 is an absolute position, the 8 position of the landmark detected by the non-contact sensor 24 and obtained by the calculation unit 20C is also an absolute position. The calculation unit 20C reads the position corresponding to the landmark 8 detected by the non-contact sensor 24 from the positions (registered positions) of the plurality of landmarks 8 obtained using the GPS in advance and stored in the storage device 25 of the dump truck 2 or in the storage device 13 of the management device 10. Then, the calculation unit 20C obtains position deviation between the landmark 8 actually detected by the non-contact sensor 24 and the registration position corresponding thereto.

The traveling control unit 20D causes the dump truck 2 to travel along the traveling path set in advance based on the own position of the dump truck 2 detected by the position detection device 29 as an own position detection device. In this case, the traveling control unit 20D controls a traveling state of the dump truck 2 by controlling at least one of the steering, the accelerator, and the brake of the dump truck 2. Further, the traveling control unit 20D causes the dump truck 2 to travel with dead reckoning navigation when the position detection device 29 becomes unable to detect the own position of the dump truck 2.

The storage device 25 included in the processing system 2S is connected with the processing device 20. With such a structure, the processing device 20 and the storage device 25 can mutually exchange information. The storage device 25 is a random access memory (RAM), a read only memory (ROM), an erasable programmable read only memory (EPROM), an electrically erasable programmable read-only memory (EEPROM), a hard disk drive, or combinations thereof. The storage device 25 stores various types of information related to management of the dump truck 2. The information stored in the storage device 25 includes a database 25B in which information used for control of the dump truck 2 is registered, a computer program for causing the processing device 20 to execute various types of processing, and the like. In the present embodiment, the storage device 25 can store information equivalent to that of the storage device 13 arranged in the control facility 7.

The wireless communication device 28 included in the processing system 2S is an on-vehicle communication device mounted on the dump truck 2 and performs wireless communication. The wireless communication device 28 includes the antenna 28A. The wireless communication device 28 is connected with the processing device 20. The wireless communication device 28 receives information including a command signal transmitted from at least one of the management device 10 and the vehicle 3. The information received by the wireless communication device 28 is output to the processing device 20, and stored in the storage device 25 through the processing device 20. The processing device 20, to be specific, the traveling control unit 20D can control traveling of the dump truck 2 according to the command signal received by the wireless communication device 28. Further, the wireless communication device 28 can transmit information output by the processing device 20 to at least one of the management device 10 and the vehicle 3. That is, the processing device 20 can transmit/receive the information to/from at least one of the management device 10 and the vehicle 3 through the wireless communication device 28.

The position detection device 29 included in the processing system 2S is mounted on the dump truck 2. The position detection device 29 is connected with the processing device 20. The position detection device 29 includes a GPS receiver and the GPS antenna 29A. The antenna 29A is arranged outside the dump truck 2, and in a position where the antenna 29A can easily receive the radio wave from the GPS satellite 5 illustrated in FIG. 1.

The position detection device 29 obtains the own position of the dump truck 2 using the GPS. The own position obtained by the position detection device 29 is the position of the dump truck 2 obtained by the GPS, that is, a GPS position and also an absolute position. The own position detected by the position detection device 29 is specifically a GPS position of the antenna 29A attached to the dump truck 2. In the present embodiment, the GPS position of the antenna 29A is used as the own position of the dump truck 2. The processing device 20 illustrated in FIG. 4 can obtain positions of respective units of the dump truck 2, and the position of the landmark 8 with respect to the dump truck 2, which has been detected by the non-contact sensor 24, using the own position as a reference.

The antenna 29A receives the radio wave from the GPS satellite 5. The antenna 29A outputs a signal based on the received radio wave to the position detection device 29. The position detection device 29 obtains the GPS position of the antenna 29A based on the signal output from the antenna 29A. When the GPS position of the antenna 29A is obtained, the GPS position of the dump truck 2, that is, the own position of the dump truck 2 is obtained.

<Vehicle>

Figure 5:
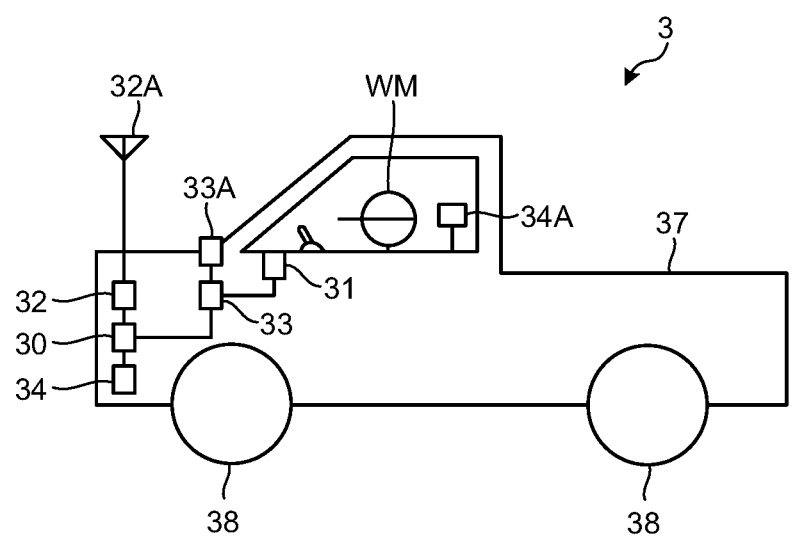
FIG. 5 is a diagram schematically illustrating an appearance of a vehicle according to the present embodiment.
Figure 6:
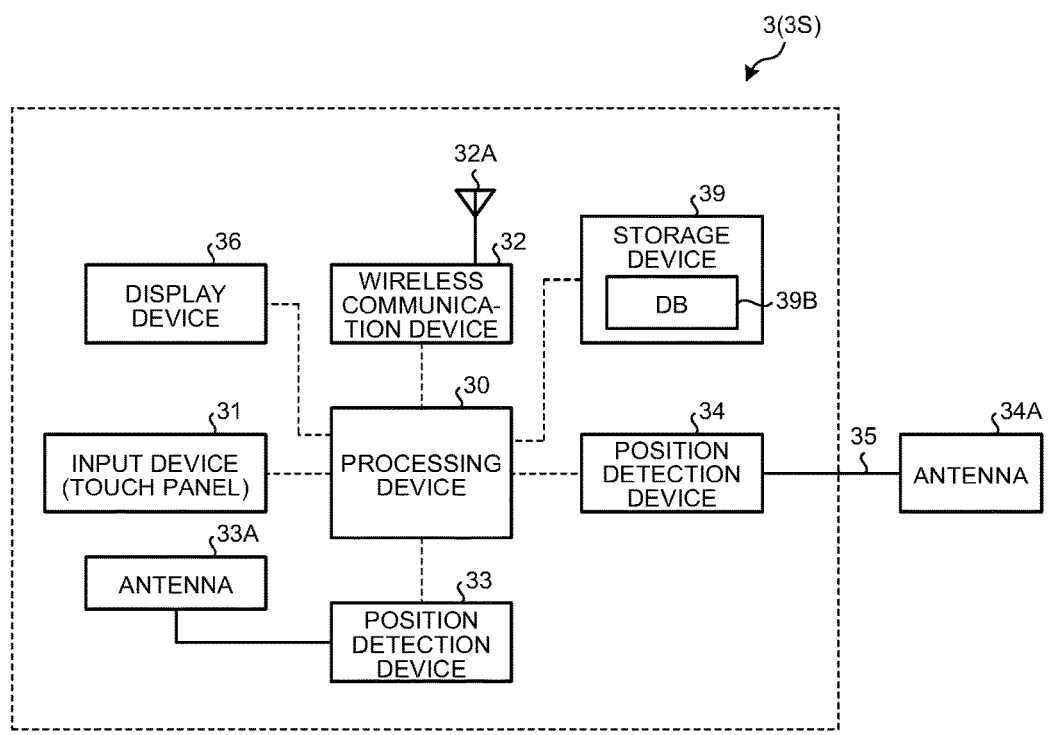
FIG. 6 is a block diagram of a control system of a vehicle according to the present embodiment.

FIG. 5 is a diagram schematically illustrating an appearance of the vehicle 3 according to the present embodiment. FIG. 6 is a block diagram of a control system of the vehicle 3 according to the present embodiment. As illustrated in FIGS. 5 and 6, the vehicle 3 includes a vehicle main body 37, wheels 38, a processing device 30, a storage device 39, a wireless communication device 32 to which an antenna 32A is connected, a position detection device 33 to which an antenna 33A is connected, a display device 36, and an input device 31.

An internal combustion engine as an engine is mounted on the vehicle main body 37. The wheels 38 are rotated by power transmitted from the engine of the vehicle main body 37, and allow the vehicle 3 to travel. In the present embodiment, a worker WM boarding the vehicle 3 operates the vehicle 3.

<Control System 3S of Vehicle 3>

The processing device 30 included in a control system 3S of the vehicle 3 includes a central processing unit (CPU). The storage device 39, the wireless communication device 32, a position detection device 34, the display device 36, and the input device 31 are connected to the processing device 30, and the processing device 30 executes various types of processing. In the present embodiment, the processing device 30 can execute processing equivalent to that of the processing device 12 arranged in the control facility 7 and the processing device 20 arranged in the dump truck 2.

The storage device 39 included in the control system 3S of the vehicle 3 is mounted on the vehicle 3. The storage device 39 is a random access memory (RAM), a read only memory (ROM), an erasable programmable read only memory (EPROM), an electrically erasable programmable read-only memory (EEPROM), a hard disk drive, or combinations thereof. The storage device 39 stores a database 39B in which information is registered, and a computer program for causing the processing device 30 to execute various types of processing. Note that the storage device 39 may store information equivalent to that of the storage device 13 arranged in the control facility 7 and the storage device 25 arranged in the dump truck 2.

The display device 36 included in the control system 3S of the vehicle 3 can display the information related to the position of the vehicle 3 and the information related to the position of the landmark 8. The display device 36 is, for example, but not limited to, a flat panel display such as a liquid crystal display.

The input device 31 included in the control system 3S of the vehicle 3 includes at least one of a keyboard, a touch panel, and an operation switch. The input device 31 inputs an operation signal to the processing device 30. For example, the worker (operator) WM of the vehicle 3 operates the input device 31 to input information to the processing device 30 or input a command.

The wireless communication device 32 included in the control system 3S of the vehicle 3 is mounted on the vehicle 3. The wireless communication device 32 is connected with the processing device 30. Further, the wireless communication device 32 includes the antenna 32A. The wireless communication device 32 receives information including a command signal transmitted from at least one of the management device 10 and the dump truck 2. The information received by the wireless communication device 32 is output to the processing device 30, and stored in the storage device 39 through the processing device 30. Further, the wireless communication device 32 can transmit information from the processing device 30 to at least one of the management device 10 and the dump truck 2.

The position detection device 33 included in the control system 3S of the vehicle 3 is mounted on the vehicle 3. The position detection device 33 is connected with the processing device 30. The position detection device 33 includes a GPS receiver and the GPS antenna 33A. The antenna 33A is arranged outside the vehicle 3, and a position where the antenna 33A can easily receive the radio wave from the GPS satellite 5 illustrated in FIG. 1.

The position detection device 33 obtains the position (hereinafter, appropriately referred to as vehicle position) of the vehicle 3. The vehicle position obtained by the position detection device 33 is the position of the vehicle 3 obtained by the GPS, that is, a GPS position and also an absolute position. The vehicle position obtained by the position detection device 33 is specifically a GPS position of the antenna 33A attached to the vehicle 3. In the present embodiment, the GPS position of the antenna 33A is used as the vehicle position. The processing device 30 illustrated in FIG. 6 can obtain positions of the respective units of the vehicle 3 using the vehicle position as a reference.

The antenna 33A receives the radio wave from the GPS satellite 5. The antenna 33A outputs a signal based on the received radio wave to the position detection device 33. The position detection device 33 obtains the GPS position of the antenna 33A based on the signal output from the antenna 33A. When the GPS position of the antenna 33A is obtained, the GPS position of the vehicle 3, that is, the vehicle position can be obtained.

In the present embodiment, a GPS antenna 34A is mounted on the vehicle 3. The antenna 34A receives the radio wave from the GPS satellite 5 illustrated in FIG. 1. The antenna 34A is releasably mounted on the vehicle 3. The antenna 34A released from the vehicle 3 can be moved outside the vehicle 3 and to a position separated from the vehicle 3. The worker WM holds the antenna 34A, and can move the antenna 34A to the position outside the vehicle 3 and in the position separated from the vehicle 3. As described above, the antenna 34A can receive the radio wave from the GPS satellite 5 in a state of being arranged outside the vehicle 3.

The position detection device 34 included in the control system 3S of the vehicle 3 is mounted on the vehicle 3. The position detection device 34 is connected with the processing device 30. The position detection device 34 includes a GPS receiver and the GPS antenna 34A. The position detection device 34 and the antenna 34A are connected through a cable 35. The position detection device 34 detects the position (GPS position) of the antenna 34A.

In a case where the antenna 34A is carried by the worker WM, the position of the antenna 34A is detected, so that the position (GPS position) of the worker WM is detected. In a case where the antenna 34A is installed near an object, the position of the antenna 34A is detected, so that the position (GPS position) of the object is detected.

The antenna 34A outputs the signal based on the radio wave, which has been received from the GPS satellite 5, to the position detection device 34 through the cable 35. The position detection device 34 detects the position of the antenna 34A based on the signal acquired from the antenna 34A. The position detection device 34 converts the signal based on the radio wave from the GPS satellite 5 and received by the antenna 34A, into an electrical signal, and obtains the position of the antenna 34A. When the GPS position of the antenna 34A is obtained, the GPS position of the object arranged near the antenna 34A is obtained. This object includes the worker.

<Method of Using Landmark>

Figure 7:
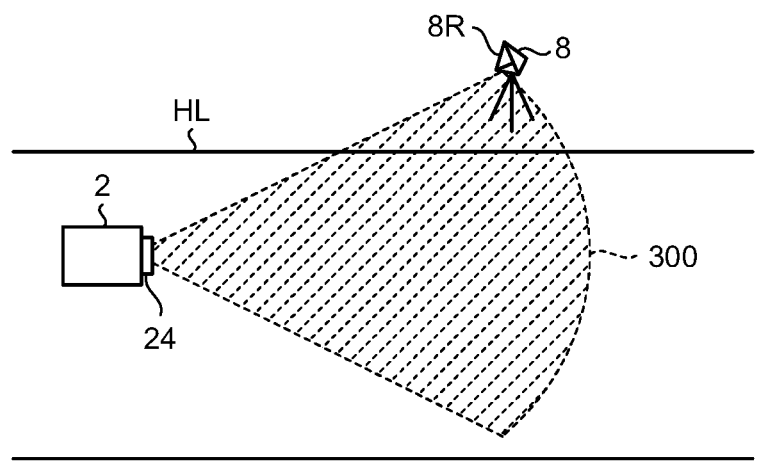
FIG. 7 is a diagram illustrating an example of a state in which a landmark is detected by a non-contact sensor of the dump truck.

FIG. 7 is a diagram illustrating an example of a state where the landmark 8 is detected by the non-contact sensor 24 of the dump truck 2. The landmarks 8 are structures respectively arranged in the loading place LPA, the dumping place DPA, and the conveying path HL. On the conveying path HL, the landmark 8 is arranged outside the conveying path HL, for example, on a shoulder of the conveying path HL. A plurality of the landmarks 8 is arranged with a space along the conveying path HL. In the present embodiment, the landmarks 8 are arranged in every 100 m, for example. However, the interval of adjacent landmarks 8 is not limited to 100 m.

The landmark 8 includes a reflecting portion (reflecting surface) 8R that can reflect the radio wave emitted from the non-contact sensor 24. Reflectance (reflection intensity) of the reflecting portion 8R of the landmark 8 with respect to the radio wave is higher than reflectance (reflection intensity) of an object around the landmark 8, for example, a rock in the mine, or the like. Therefore, the non-contact sensor 24 illustrated in FIG. 4 can detect the landmark 8 separately from the peripheral object.

As illustrated in FIG. 7, the radio wave is emitted from the emission unit of the non-contact sensor 24 arranged on the dump truck 2, with which the landmark 8 is irradiated. At least a part of the radio wave with which the landmark 8 is irradiated is reflected at the reflecting portion 8R of the landmark 8. The non-contact sensor 24 receives the radio wave from the landmark 8 reflected at the reflecting portion 8R with the reception unit. The non-contact sensor 24 receives the radio wave from the landmark 8 to detect the landmark 8 itself, or detect the relative position between the non-contact sensor 24 and the landmark 8, that is, the relative position of the landmark 8 with respect to the dump truck 2.

In the present embodiment, the radio wave from the non-contact sensor 24 propagates to be spread from the emission unit of the non-contact sensor 24. The landmark 8 exists in a space (propagation space) where the radio wave emitted from the non-contact sensor 24 propagates, so that the non-contact sensor 24 can detect the landmark 8 itself and its position. Further, the radio wave emitted from the non-contact sensor 24 attenuates with its progress. Therefore, the radio wave emitted from the non-contact sensor 24 is decreased in intensity with its progress. The landmark 8 exists in the propagation space in which the radio wave emitted from the non-contact sensor 24 propagates in a state of maintaining intensity of a predetermined value or more, so that the non-contact sensor 24 can detect the landmark 8 itself and its position. Hereinafter, the propagation space of the radio wave in which the non-contact sensor 24 can detect the landmark 8 itself and its position based on the radio wave emitted by the non-contact sensor 24 itself is appropriately referred to as detection region (detection space) 300 of the non-contact sensor 24. The dimension of the detection region 300 existing in a traveling direction side of the dump truck 2 in the traveling direction side is, for example, but not limited to, 50 m.

The non-contact sensor 24 may be an optical sensor that detects the landmark 8 using a laser light as detection light, for example. In this case, the non-contact sensor 24 includes an emission unit that can emit the detection light, and a reception unit that can receive at least a part of the detection light emitted from the emission unit and reflected at the landmark 8, for example. The landmark 8 is arranged in a space (irradiation space) irradiated with the detection light emitted from the non-contact sensor 24, so that the non-contact sensor 24 can detect the landmark 8. In a case where the non-contact sensor 24 detects the landmark 8 using the detection light, the detection region 300 of the non-contact sensor 24 includes the irradiation space of the detection light where the landmark 8 can be detected based on the detection light emitted from the non-contact sensor 24.

In the present embodiment, the position of the landmark 8 is detected also using the GPS. The position of the landmark 8 detected using the GPS is a GPS position and also an absolute position. In the present embodiment, the position of the landmark 8 detected using the GPS and obtained in advance, that is, the GPS position is stored in the storage device 13 of the management device 10 illustrated in FIG. 2. The GPS position of the landmark 8 stored in the storage device 13 is the above-described registration position.

Information related to the relative position between the dump truck 2 and the landmark 8, which has been detected using the non-contact sensor 24, is transmitted to the management device 10, to be specific, the processing device 12, through the communication system 9. The processing device 12 can obtain the absolute position (GPS position) of the dump truck 2 based on the information related to the relative position between the dump truck 2 and the landmark 8, which has been detected using the non-contact sensor 24, and the information related to the absolute position (GPS position) of the landmark 8 registered (stored) in the storage device 13.

The position of the landmark 8 detected using the GPS, that is, the GPS position may be stored in the storage device 25 of the dump truck 2. In this case, the processing device 20 of the dump truck 2 can obtain the absolute position (GPS position) of the dump truck 2 based on the information related to the relative position between the dump truck 2 and the landmark 8, which has been detected using the non-contact sensor 24, and the information related to the absolute position (GPS position) of the landmark 8 stored in the storage device 25. Further, as for the GPS position of the landmark 8, a part or whole of the information stored in the storage device 13 of the management device 10 may be transmitted to and stored in the storage device 25 of the dump truck 2 through the wireless communication devices 18 and 28. The GPS position of the landmark 8 stored in the storage device 25 of the dump truck 2 is the above-described registration position.

If the storage device 25 of the dump truck 2 stores a part of the GPS position of the landmark 8, which is stored in the storage device 13 of the management device 10, it is not necessary to store the GPS positions of the landmarks 8 in the entire mine. Therefore, the capacity of the storage device 25 can be made small. In this case, the management device 10 favorably transmits and stores the GPS positions of the landmarks 8 existing in a predetermined range in a periphery of the position of the dump truck 2 at a present point of time to the storage device 25 of the dump truck 2. In doing so, the management system 1 can cover the GPS positions of the landmarks 8 in the entire mine while suppressing an increase in the capacity of the storage device 25 of the dump truck 2.

<Method of Traveling of Dump Truck>

Next, an example of a method of traveling of the dump truck 2 according to the present embodiment will be described. In the description below, an example in which the management device 10 illustrated in FIG. 2, to be specific, the processing device 12 manages traveling of the dump truck 2 will be described. The processing device 12 transmits a traveling command signal to the processing device 20 of the dump truck 2 illustrated in FIG. 4, to be specific, the traveling control unit 20D, through the communication system 9, to be specific, the wireless communication device 18 and the wireless communication device 28. The traveling command signal includes information of a command value of a traveling speed of the dump truck 2 and the traveling path generated by the traveling path generation unit 12B.

The traveling control unit 20D of the dump truck 2 controls the dump truck 2 to control traveling of the dump truck 2 based on the traveling command signal of the processing device 12 transmitted through the communication system 9. In this case, the traveling control unit 20D operates at least one of steering, an accelerator, and a brake of the dump truck 2.

An example in which the dump truck 2 travels based on the dead reckoning navigation will be described. In the present embodiment, the dump truck 2 travels in at least a part of the loading place LPA, the dumping place DPA, and the conveying path HL according to the traveling path generated by the traveling path generation unit 12B of the management device 10. The traveling control unit 20D of the processing device 20 of the dump truck 2 causes the dump truck 2 to travel along the traveling path generated by the traveling path generation unit 12B and set in advance while reckoning the current position of the dump truck 2 using the dead reckoning navigation.

The dead reckoning navigation refers to navigation to reckon a current own position of an object, that is, the dump truck 2 in the present embodiment, based on the azimuth from a starting point where the longitude and the latitude are known (azimuth change amount), and the moving distance for traveling. As described above, the azimuth of the dump truck 2 is obtained using the gyro sensor 26 mounted on the dump truck 2. The moving distance of the dump truck 2 is obtained using the speed sensor 27 mounted on the dump truck 2.

The traveling control unit 20D of the dump truck 2 that has acquired the detection signal of the gyro sensor 26 and the detection result of the speed sensor 27 obtains the azimuth and the azimuth change amount of the dump truck 2 from the known starting point based on the detection result of the gyro sensor 26. Further, the traveling control unit 20D obtains the moving distance of the dump truck 2 from the known starting point based on the detection result of the speed sensor 27. The traveling control unit 20D obtains a control amount related to the traveling of the dump truck 2 to cause the dump truck 2 to travel along the set traveling path based on the detection result of the gyro sensor 26 and the detection result of the speed sensor 27. The traveling control unit 20D then causes the dump truck 2 to travel along the traveling path by controlling at least one of the steering, the acceleration, and the brake of the dump truck 2 based on the obtained control amount.

In the present embodiment, the traveling control unit 20D of the dump truck causes the dump truck 2 to travel by the dead reckoning navigation. However, the method is not limited thereto, and for example, the management device 10 illustrated in FIG. 2 may cause the dump truck 2 to travel by the dead reckoning navigation. In this case, the processing device 12 of the management device 10 acquires the detection signal of the gyro sensor 26 and the detection result of the speed sensor 27 through the communication system 9. The processing device 12 then obtains the control amount related to the traveling of the dump truck 2 to cause the dump truck 2 to travel along the set traveling path based on the detection result of the gyro sensor 26 and the detection result of the speed sensor 27. Next, the processing device 12 transmits the control amount obtained through the communication system 9 to the processing device 20 of the dump truck 2. The traveling control unit 20D of the processing device 20 causes the dump truck 2 to travel along the traveling path by controlling at least one operation of the steering, the accelerator, and the brake of the dump truck 2 based on the control amount acquired from the processing device 12 of the management device 10.

Next, an example in which the dump truck 2 travels while the own position of the dump truck 2 obtained by the dead reckoning navigation (hereinafter, the own position is appropriately referred to as reckoned position) is corrected using the GPS will be described. If the traveling distance of the dump truck 2 becomes long, there is a possibility of causing an error between the reckoned position of the dump truck 2 and the actual own position of the dump truck 2 due to accumulation of detection errors of one or both of the gyro sensor 26 and the speed sensor 27. As a result, there is a possibility that the dump truck 2 deviates from the traveling path generated by the traveling path generation unit 12B of the processing device 12.

In the present embodiment, when the dump truck 2 travels by the dead reckoning navigation, the traveling control unit 20D causes the dump truck 2 to travel while correcting the reckoned position of the dump truck 2 using the information related to the GPS position of the dump truck 2, which has been detected by the position detection device 29. The traveling control unit 20D corrects the reckoned position of the dump truck 2 based on the detection result of the gyro sensor 26, the detection result of the speed sensor 27, and the information related to the GPS position of the dump truck 2, which has been detected by the position detection device 29. The traveling control unit 20D calculates the control amount related to the traveling of the dump truck 2 to cause the dump truck 2 to travel along the traveling path using the corrected reckoned position. The traveling control unit 20D then controls the traveling of the dump truck 2 based on the obtained control amount to cause the dump truck 2 traveling using the dead reckoning navigation to travel along the traveling path.

Next, an example in which the dump truck 2 travels by the dead reckoning navigation while the reckoned position obtained by the dead reckoning navigation is corrected using the landmark 8. There is a possibility that a state in which detection accuracy (measuring accuracy) by the GPS is decreased and a state in which measurement by the GPS becomes disabled are caused in the mine. For example, in a case where the antenna 29A cannot sufficiently receive the radio wave from the GPS satellite 5 due to an influence of an obstacle, or in a case where the number of GPS satellites 5 from which the antenna 29A can receive the radio waves is small, in the mine, there is the possibility that a state in which detection accuracy by the GPS is decreased and a state in which measurement by the GPS becomes disabled are caused.

In the present embodiment, when correction of the reckoned position obtained by the dead reckoning navigation using the GPS is difficult, the traveling control unit 20D of the dump truck 2 corrects the reckoned position using the landmark 8. That is, when not correcting the reckoned position using the GPS, the traveling control unit 20D corrects the reckoned position of the dump truck 2 obtained by the dead reckoning navigation using the relative position between the landmark 8 and the dump truck 2, which has been detected using the non-contact sensor 24, and the registration position corresponding to the landmark 8 detected using the non-contact sensor 24.

Figure 8:
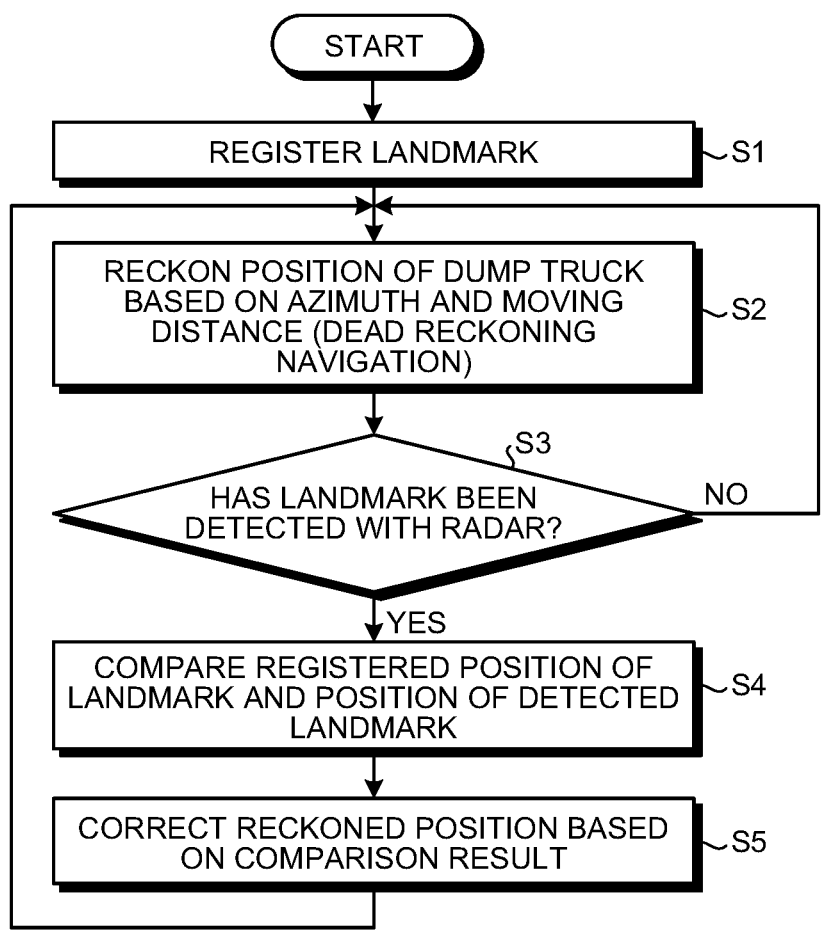
FIG. 8 is a flowchart illustrating an example of a method of traveling of the dump truck including correction of a reckoned position using the landmark and the non-contact sensor.

FIG. 8 is a flowchart illustrating an example of a method of traveling of the dump truck 2 including correction of the reckoned position using the landmark 8 and the non-contact sensor 24. In the mine, a plurality of the landmarks 8 is installed in the loading place LPA, the dumping place DPA, and the conveying path HL, before the operation of the dump truck 2. Each of the positions (that are the GPS positions and also the absolute positions) of the plurality of landmarks 8 is detected using the GPS. The information related to the positions of the landmarks 8 detected using the GPS are stored in the storage device 13 of the management device 10 to become the registration positions (step S1). In the present embodiment, a part or whole of the information related to the positions of the landmarks 8 is transmitted to and stored in the storage device 25 included in the processing system 2S of the dump truck 2 through the communication system 9.

The traveling control unit 20D of the dump truck 2 causes the dump truck 2 to travel based on the dead reckoning navigation (step S2). During the traveling of the dump truck 2, the traveling control unit 20D causes the non-contact sensor 24 to emit the radio wave. The detection result of the non-contact sensor 24 is output to the traveling control unit 20D. The traveling control unit 20D determines whether the landmark 8 has been detected based on the detection result of the non-contact sensor 24 (step S3).

In step S3, when it has been determined that the landmark 8 has not been detected (No in step S3), the traveling of the dump truck 2 based on the dead reckoning navigation is continued (step S2). In step S3, when it has been determined that the landmark 8 has been detected (Yes in step S3), the traveling control unit 20D compares the position of the landmark 8, which is stored in the storage device 25, that is, the registration position, and the position (measured position) of the landmark 8, which has been detected by the non-contact sensor 24 (step S4). The traveling control unit 20D obtains the measured position of the landmark 8 based on the information related to the relative position between the dump truck 2 and the landmark 8, which has been detected by the non-contact sensor 24, and the reckoned position of the dump truck 2 at the point of time when the non-contact sensor 24 detects the landmark 8.

In this case, the traveling control unit 20D extracts, from the storage device 25, the information corresponding to the landmark 8 detected by the non-contact sensor 24, of the information related to the positions of the plurality of landmarks 8, which is stored in the storage device 25. That is, the position of the landmark 8 closest to the reckoned position in the traveling direction side of the dump truck 2 at timing when the non-contact sensor 24 has detected the landmark 8 is extracted, from the registration positions (GPS positions) of the plurality of landmarks 8, which are stored in the storage device 25. In step S4, the registration position of the landmark 8, which has been extracted as described above, is compared with the measured position of the landmark 8, which has been detected by the non-contact sensor 24.

In the present embodiment, the registration position of the landmark 8 and the measured position are compared in step S4. However, the embodiment is not limited thereto. For example, the reckoned position of the dump truck 2 and the position of the dump truck 2 obtained from the registration position of the landmark 8 may be compared in step S4. In this case, the position of the dump truck 2 based on the registration position of the landmark 8 is obtained from the information related to the relative position between the dump truck 2 and the landmark 8, which has been detected by the non-contact sensor 24, and the registration position of the landmark 8.

The traveling control unit 20D corrects the reckoned position of the dump truck 2 based on a result of the comparison in step S4 (step S5). For example, the traveling control unit 20D obtains a correction amount of the reckoned position based on a difference between the registration position of the landmark 8, which is stored in the storage device 25, and the measured position of the landmark 8, which has been detected by the non-contact sensor 24. That is, the traveling control unit 20D obtains the control amount related to the traveling of the dump truck 2 including the above-described correction amount used to correct the reckoned position of the dump truck 2 based on the detection result of the gyro sensor 26, the detection result of the speed sensor 27, the information related to the relative position between the dump truck 2 and the landmark 8, which has been detected using the non-contact sensor 24, and the information related to the position of the landmark 8, which is stored in the storage device 25. The traveling control unit 20D controls the traveling of the dump truck 2 to cause the dump truck 2 to travel along the traveling path generate by the traveling path generation unit 12B of the processing device 12 illustrated in FIG. 2, based on the obtained correction amount and the command including the control amount.

In the present embodiment, an example in which the processing device 20 of the dump truck 2 corrects the reckoned position using the GPS or the landmark 8 has been described. However, the embodiment is not limited to the example, and the management device 10 illustrated in FIG. 2 may correct the reckoned position using the GPS or the landmark 8.

<Example of Position Detection Processing and Position Registration Processing of Landmark>

Next, an example of position detection processing and position registration processing (processing of step S1 of FIG. 8) of the landmark 8 will be described. The position detection processing of the landmark 8 is processing of detecting the position (GPS position) of the landmark 8. To be specific, the position registration processing of the landmark 8 is processing of storing and registering the detected position of the landmark 8 and the information related to the position to the storage device 13 (database 13B). Note that the position of the landmark 8 may be stored and registered to the storage device 25 (database 25B) of the dump truck 2.

Figure 9:
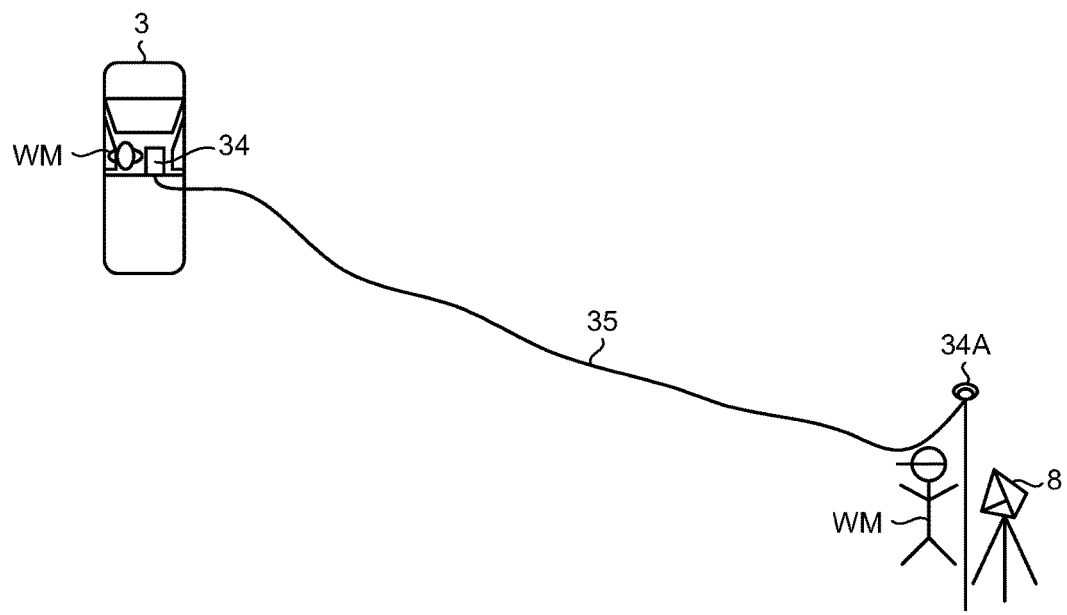
FIG. 9 is a diagram illustrating an example of landmark position detection processing and landmark position registration processing according to the present embodiment.

FIG. 9 is a diagram illustrating an example of the position detection processing and the position registration processing of the landmark 8 according to the present embodiment. The position of the landmark 8 installed in the mine is detected using the GPS. As illustrated in FIG. 9, the position of the landmark 8 is detected using the GPS antenna 34A.

The position of the vehicle 3 on which the worker WM boards is detected, and the vehicle 3 is moved near the landmark 8 to be registered. In this case, the vehicle 3 is moved near the landmark 8 to be registered in a state of mounting the antenna 34A on the own vehicle.

When the vehicle 3 arrives near the landmark 8, the worker WM holds the antenna 34A and moves the antenna 34A outside the vehicle 3. Therefore, although the antenna 34A is taken outside the vehicle 3, the position detection device 34 is mounted on the vehicle 3. Next, as illustrated in FIG. 9, the worker WM installs the antenna 34A near the landmark 8 installed in the mine. The antenna 34A receives the radio wave from the GPS satellite 5 in a state of being arranged outside the vehicle 3.

The signal based on the radio wave from the GPS satellite 5 received by the antenna 34A is output to the position detection device 34 through the cable 35. The position detection device 34 detects the position (GPS position) of the antenna 34A based on the signal from the antenna 34A. As illustrated in FIG. 9, the antenna 34A outputs the signal based on the radio wave from the GPS satellite 5 to the position detection device 34 in a state of being installed near the landmark 8. Therefore, the position detection device 34 obtains the GPS position of the antenna 34A, so that the GPS position of the landmark 8 is detected.

The processing device 30 of the vehicle 3 transmits the information based on the signal from the antenna 34A to the wireless communication device 18 of the management device 10 using the wireless communication device 32 mounted on the vehicle 3. In the present embodiment, the information based on the signal from the antenna 34A includes the information related to the position of the antenna 34A, the information related to the position of the landmark 8, and the like, which have been detected by the position detection device 34 based on the signal from the antenna 34A. Hereinafter, the aforementioned information is referred to as landmark position information. The wireless communication device 18 of the management device 10 receives the landmark position information received from the wireless communication device 32 of the vehicle 3. The processing device 12 of the management device 10 acquires the information related to the landmark position information transmitted from the vehicle 3 through the wireless communication device 18, and registers the information to the storage device 13 (database 13B).

<Position Deviation of Installed Landmark 8>

Figure 10:
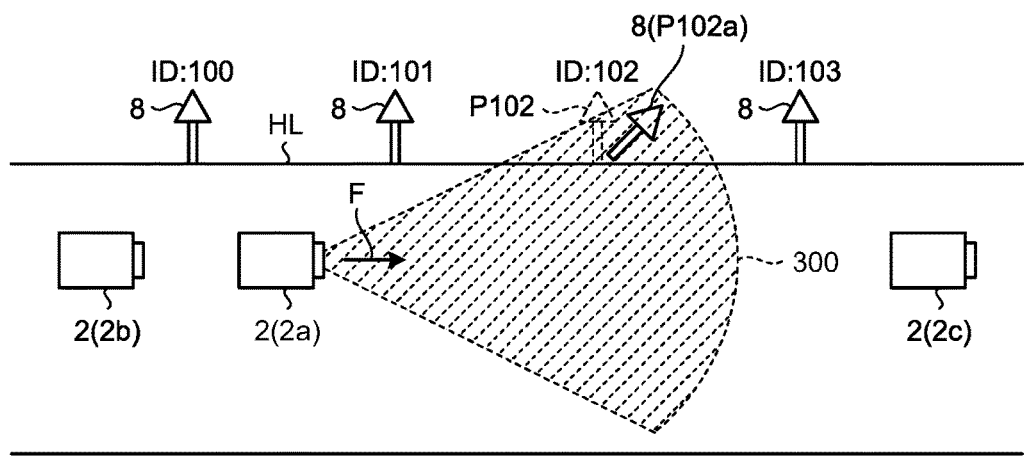
FIG. 10 is a diagram illustrating the dump truck traveling in a conveying path, and a plurality of landmarks installed along the conveying path.

FIG. 10 is a diagram illustrating the dump trucks 2 traveling in the conveying path HL, and a plurality of the landmarks 8 installed along the conveying path HL. In the mine, the conveying path HL is changed with the progress of quarry, and a new conveying path HL is built. Since the conveying path HL in the mine is changed from moment to moment, the landmarks 8 installed along the conveying path HL are moved. Therefore, the landmarks 8 used in the mine are difficult to install on the ground in a semi-permanent fixing method. As a result, there is a possibility that the once installed landmark 8 deviates from the original position. The original position is the registration position and also the absolute position stored in the storage device 25 of the dump truck 2 or the storage device 13 of the management device 10.

If the installed landmark 8 deviates from the original position, the non-contact sensor 24 of the dump truck 2 traveling in the conveying path HL detects the landmark 8 deviating from the original position. Therefore, when correcting the reckoned position with the position of the landmark 8, the traveling control unit 20D of the dump truck 2 traveling by the dead reckoning navigation corrects the reckoned position based on the deviating position. As a result, there is a possibility that the dump truck 2 deviates from the conveying path HL. The dump truck 2 deviating from the conveying path HL requires a time to return to the conveying path HL. As a result, productivity of the mine may be decreased.

In the example illustrated in FIG. 10, the four landmarks 8 are installed along the conveying path HL. IDs for identifying the respective landmarks are 100, 101, 102, and 103. Among the landmarks 8, an actual position P102a of the landmark 8 with the ID 102 deviates from an original position P102. The actual position is the current position of the landmark 8 deviating from the registration position, and is the absolute position. In this case, there is a possibility that, for the dump truck 2 traveling in the conveying path HL while correcting the reckoned error using the position of the landmark 8 using the dead reckoning navigation, the reckoned position after correction deviates from the original position, if using the actual position P102a of the landmark 8 with the ID 102. As a result, the dump truck 2 may deviate from the traveling path and the conveying path HL determined in advance.

In the present embodiment, the management system 1 and the mining machine management method obtain the position deviation of the landmark 8 based on the registration position, the GPS position of the dump truck 2, and the position of the landmark 8 detected by the non-contact sensor 24, when the GPS normally functions. As for the landmark 8 having larger position deviation than a predetermined threshold, a corresponding registration position is rewritten with the latest position of the landmark 8. In doing so, the traveling control unit 20D of the dump truck 2 can recognize the landmark 8 having the position deviation. Therefore, the traveling control unit 20D can try not to use the position of the landmark having the position deviation for correction of the reckoned position, or can modify the position of the landmark having the position deviation and use the modified position for correction of the reckoned position. As a result, in a case of correcting the reckoned position with the position of the landmark 8, the possibility that the dump truck 2 deviates from the traveling path and the conveying path HL determined in advance is decreased. Therefore, a decrease in the productivity of the mine is suppressed. Next, a processing procedure of a case where the management system 1 executes the mining machine management method according to the present embodiment will be described.

<Processing of Mining Machine Management Method>

Figure 11:
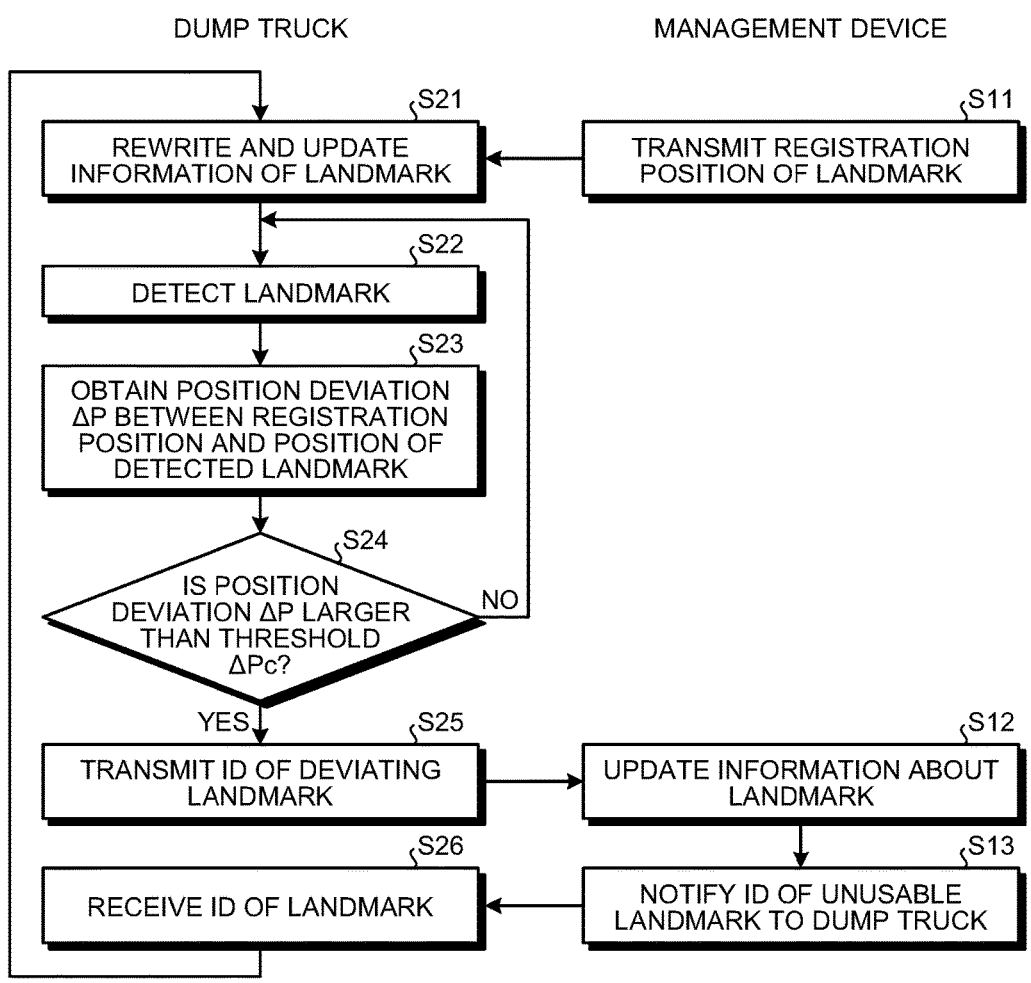
FIG. 11 is a flowchart illustrating a procedure of a mining machine management method according to the present embodiment.

FIG. 11 is a flowchart illustrating a procedure of the mining machine management method according to the present embodiment. The mining machine management method according to the present embodiment is mainly executed by the management device 10 illustrated in FIG. 2 and the processing system 2S of the dump truck 2 illustrated in FIG. 4. However, the method may be executed by one of the management device 10 and the processing system 2S of the dump truck 2. Steps S11 to S13 are processing executed by the management device 10. Steps S21 to S26 are processing executed by the processing system 2S of the dump truck 2.

In step S11, the processing device 12 of the management device 10 transmits the registration position of the landmark 8 stored in the own device to the storage device 25 included in the processing system 2S of the dump truck 2 through the communication system 9 illustrated in FIG. 1. Favorably, this processing is executed when the processing device 12 of the management device 10 transmits a part of the registration information of all of the landmarks 8 stored in the storage device 13 to the storage device 25 included in the processing system 2S according to the position where the dump truck 2 travels. Further, the processing of step S11 is executed when there is change in the registration information. The processing device 12 may collectively transmit the whole registration information, instead of transmitting a part of the registration information of all of the landmarks 8 stored in the storage device 13.

In step S21, the processing system 2S that has received the registration information rewrites and updates the information of the landmarks 8 stored in the storage device 25 with the received registration information. The information of the landmarks 8 stored in the storage device 25 includes the positions of the landmarks 8. This information may further include the IDs of the landmarks, the information (for example, flags) as to whether the landmark can be used for correction of the reckoned position, and the like. Next, the processing is moved onto step S22, and the non-contact sensor 24 of the dump truck 2 detects the landmark 8 and its position. Here, detection of the landmark 8 will be described.

Figure 12:
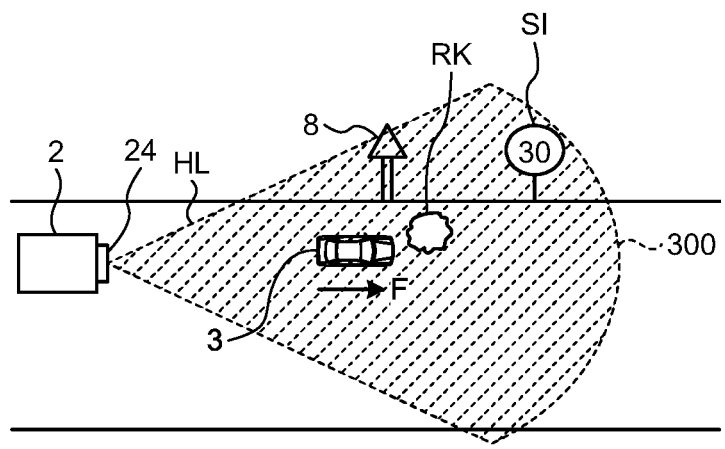
FIG. 12 is a diagram illustrating an example of a technique to detect a landmark.
Figure 13:
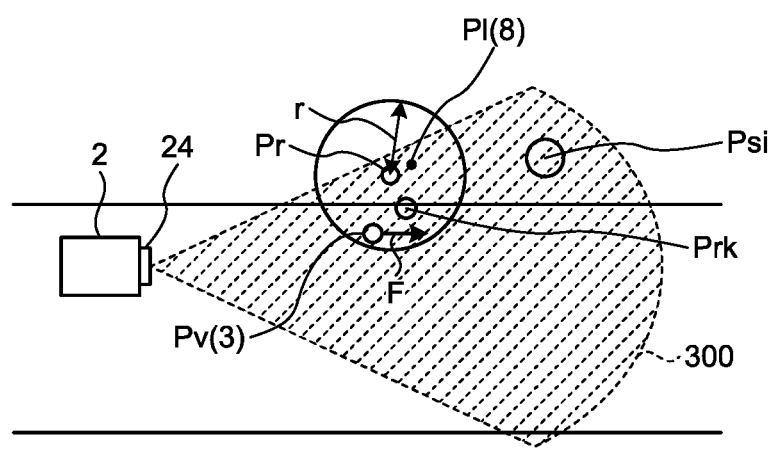
FIG. 13 is a diagram illustrating an example of a technique to detect a landmark.
Figure 14:
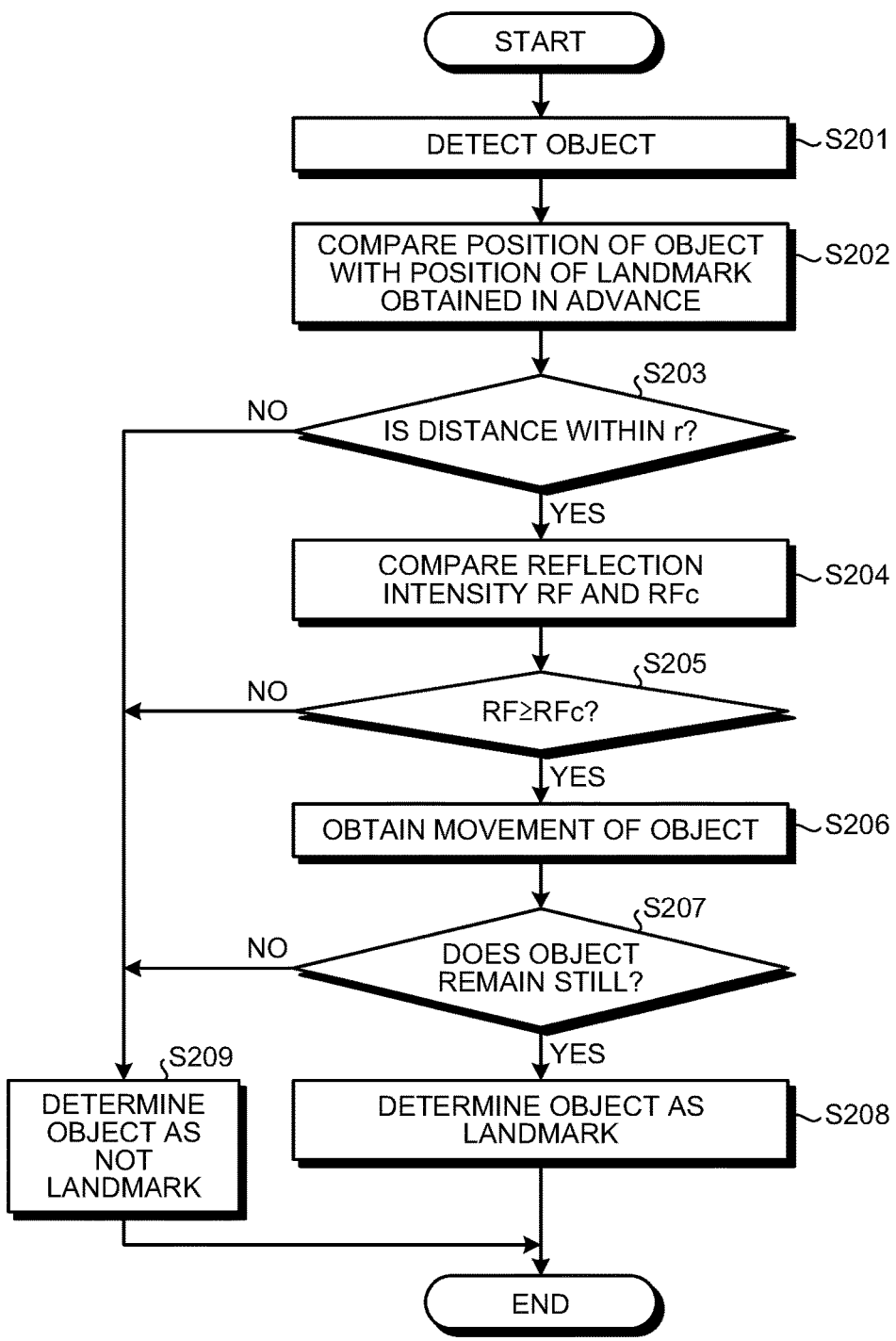
FIG. 14 is a flowchart illustrating a procedure of an example of processing of detecting a landmark.

FIGS. 12 and 13 are diagrams illustrating an example of a technique of detecting the landmark 8. FIG. 14 is a flowchart illustrating a procedure of an example of processing of detecting the landmark 8. In the present embodiment, when the non-contact sensor 24 detects the landmark 8, the non-contact sensor 24 distinguishes the landmark 8 from another object using the reflection intensity of the object detected by the non-contact sensor 24, the movement of the object detected by the non-contact sensor 24, and the difference between the registered position of the landmark 8 and the position of the object obtained by the non-contact sensor 24.

As illustrated in FIG. 12, assume that the landmark 8, a rock RK, a sign SI, and the vehicle 3 exist in the traveling direction side of the dump truck 2 that travels in the conveying path HL. These objects are in the detection region 300 of the non-contact sensor 24. The vehicle 3 is moved in the direction illustrated by the arrow F. The arrow F indicates the traveling direction of the vehicle 3. In step S201, when the non-contact sensor 24 detects these objects, the position of the landmark 8 is Pl, the position of the rock RK is Prk, the position of the sign SI is Psi, the position of the vehicle 3 is Pv, as illustrated in FIG. 13.

The registered position of the landmark 8 obtained in advance and stored in the storage device 13 of the management device 10 illustrate in FIG. 2 or in the storage device 25 of the dump truck 2 illustrated in FIG. 4 is Pr (hereinafter, appropriately referred to as registration landmark position Pr). As illustrated in FIG. 13, when the non-contact sensor 24 has detected these objects, information indicating that an object having different reflection intensity and a moving object exist in the detection region 300 can be obtained. The traveling control unit 20D identifies the landmark 8 by executing the processing of step S202 and subsequent steps from the aforementioned information. In the description below, the objects detected by the non-contact sensor 24 are appropriately referred to as detected objects.

The traveling control unit 20D obtains the positions of these detected objects from the distances and azimuths before executing the processing of step S202 and subsequent steps. The positions of the detected objects are relative positions to the non-contact sensor 24. Therefore, the traveling control unit 20D obtains the absolute positions of the detected objects using the position (absolute position) of the dump truck 2 at the time when the non-contact sensor 24 has detected the objects. In the present embodiment, the position of the dump truck 2 at the time when the non-contact sensor 24 has detected the objects is obtained by the position detection device 29 of the dump truck 2 using the GPS. Hereinafter, all of the position Pl corresponding to the landmark 8, the position Prk corresponding to the rock RK, the position Psi corresponding to the sign SI, and the position Pv corresponding to the vehicle 3 are absolute positions.

In step S202, the traveling control unit 20D acquires the registration landmark position Pr from the storage device 25 of the dump truck 2 illustrated in FIG. 4, and compares the registration landmark position Pr with the absolute positions of the detected objects. The registration landmark position Pr is a GPS position and is also an absolute position. After the comparison of step S202, the traveling control unit 20D moves the processing onto step S203. In step S203, when the distances between the absolute positions of the detected objects and the registration landmark position Pr are within a predetermined threshold r (Yes in step S203), the traveling control unit 20D executes processing of step S204 for the detected objects. The predetermined threshold r is used to identify the landmark 8. In the example illustrated in FIG. 13, the distances between the registration landmark position Pr, and the position Pl, the position Prk, and the position Pv are within the predetermined threshold r. Therefore, the traveling control unit 20D executes the processing of step S204 for these objects.

In step S204, the traveling control unit 20D compares reflection intensity RF of the detected objects such as the position Pl, the position Prk, and the position Pv with a threshold RFc of the reflection intensity determined in advance. The threshold RFc of the reflection intensity is used to exclude an object having low reflection intensity such as the rock and the like when identifying the landmark 8 from the detected objects. The magnitude of the threshold RFc of the reflection intensity is determined to achieve the objective. After the comparison of step S204, the traveling control unit 20D moves the processing onto step S205.

In step S205, when there is the detected object having the reflection intensity RF that is the threshold RFc of the reflection intensity or more (RF≥RFc) (Yes in step S205), the traveling control unit 20D executes processing of step S206 for such a detected object. In the example illustrated in FIG. 13, the reflection intensity RF of the detected objects corresponding to the position Pl and the position Pv is the threshold RFc of the reflection intensity or more, and the reflection intensity RF of the detected object corresponding to the position Prk is smaller than the threshold RFc of the reflection intensity. Therefore, the traveling control unit 20D executes processing of step S206 for the detected objects corresponding to the position Pl and the position Pv.

In the step S206, the traveling control unit 20D obtains movement of the detected objects corresponding to the position Pl and the position Pv. For example, the traveling control unit 20D determines that the detected objects corresponding to the aforementioned positions are moving when change of the position Pl and the position Pv acquired at different times is a predetermined value or more, and determines that the detected objects corresponding to the aforementioned positions remain still when the change is smaller than the predetermined value. Since the landmark 8 is a stationary structure, a moving detected object is not the landmark 8. After comparison of step S206, the traveling control unit 20D moves the processing onto step S207.

In step S207, when a detected object remains still (Yes in step S207), the traveling control unit 20D determines that the detected object is the landmark 8 in step S208. In the example illustrated in FIG. 13, the detected object corresponding to the position Pl remains still, and the detected object corresponding to the position Pv is moved toward the traveling direction F. Therefore, the detected object corresponding to the position Pl is the landmark 8. The position Pl is the absolute position of the landmark 8.

When the distance between the registration landmark position Pr and the absolute position of the detected object is larger than the predetermined threshold r (No in step S203), when there is a detected object having the reflection intensity RF that is smaller than the threshold RFc of the reflection intensity (RF<RFc) (No in step S205), and when the detected object is moving (No in step S207), the traveling control unit 20D determines that such detected objects are not the landmark 8 in step S209. The traveling control unit 20D executes such processing and identifies the landmark 8 from the objects detected by the non-contact sensor 24, so that the landmark 8 is detected by the non-contact sensor 24. In this case, before the processing of step S202 and the subsequent steps, the position (the GPS position and also the absolute position) of the detected object, which has been obtained by the traveling control unit 20D, becomes the position of the landmark 8, which has been detected by the non-contact sensor 24.

In step S23, when the non-contact sensor 24 has detected the landmark 8 and its position, the calculation unit 20C included in the processing device 20 of the processing system 2S obtains a difference (position deviation) ΔP between the registration position of the storage device 25 and the landmark position detected by the non-contact sensor 24 in step S22. Next, in step S24, the calculation unit 20C compares the position deviation ΔP and a predetermined threshold ΔPc.

Figure 15:
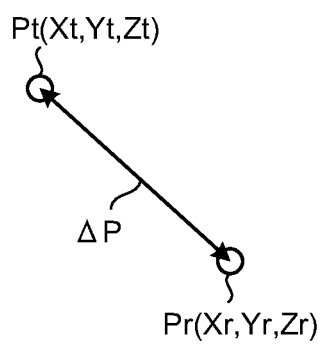
FIG. 15 is a diagram for describing that an actual position of a landmark deviates from an original position.

FIG. 15 is a diagram for describing that the actual position of the landmark 8 deviates from the original position. In FIG. 15, the actual position of the landmark 8 is Pr and the original position is Pt. The position deviation ΔP indicates the magnitude of the deviation between the actual position Pr and the original position Pt of the landmark 8. The position deviation ΔP can be obtained by $\sqrt{\{(Xr-Xt)^2+(Yr-Yt)^2+(Zr-Zt)^2\}}$, for example, where the coordinates of the actual position Pr are (Xr, Yr, Zr) and the coordinates of the original position Pt are (Xt, Yt, Zt). The predetermined threshold ΔPc can be, for example, a value in a range where the deviation of the actual position Pr from the original position Pt of the landmark 8 is allowable.

As a result of comparison, when the position deviation ΔP is larger than the predetermined threshold ΔPc (Yes in step S24), the position of the landmark 8 corresponding to the obtained position deviation ΔP deviates from the original position, and a deviation amount thereof can be determined not to be allowable. Therefore, when ΔP>ΔPc, the calculation unit 20C transmits the ID of the landmark 8 to the management device 10 through the communication system 9. In the example illustrated in FIG. 10, the position deviation ΔP between the actual position P102a of the landmark 8 having the ID 102 and the original position P102 is larger than the predetermined threshold ΔPc. Therefore, the actual position P102a of the landmark 8 having the ID 102 deviates from the original position P102, and the position deviation thereof is determined not to be allowable. In this case, in step S25, the calculation unit 20C transmits the ID 102 of the landmark 8 of which the position deviation ΔP is not allowable to the management device 10.

As a result of comparison, when the position deviation ΔP is the predetermined threshold ΔPc or less (No in step S24), the position of the landmark 8 corresponding to the obtained position deviation ΔP can be determined not to deviate from the original position, or even if the position deviates from the original position, the deviation amount thereof can be determined allowable. In this case, the processing system 2S of the dump truck 2 executes the processing of step S22 and the subsequent steps.

In the present embodiment, the storage device 25 of the dump truck 2 stores the registration positions and the IDs of the landmarks 8. The ID of the registration position closest to the landmark 8 detected in step S22 becomes the ID of the landmark 8 detected in step S22. The calculation unit 20C transmits the ID to the management device 10. Note that the storage device 25 of the dump truck 2 may not store the registration positions and the IDs of the landmarks 8. In this case, the storage device 13 of the management device 10 stores the registration positions and the IDs of the landmarks 8. In step S25, the calculation unit 20C transmits the position information of the landmark 8 of which the position deviation ΔP is not allowable to the management device 10, instead of transmitting the ID of the landmark 8 of which the position deviation ΔP is not allowable to the management device 10. The management device 10 employs the ID of the registration position that can be considered the same as the received position of the landmark 8 of which the position deviation ΔP is not allowable, as the ID of the landmark 8 of which the position deviation ΔP is not allowable.

In the present embodiment, the relationship between the predetermined threshold r for identifying the landmark 8 and the predetermined threshold ΔPc that is compared with the position deviation ΔP, illustrated in FIG. 13, is r>ΔPc. That is, in the present embodiment, when the actual position Pr of the landmark 8 detected by the non-contact sensor 24 falls within a range where the position can be considered the same as the registration position, but the deviation of the actual position Pr from the original position Pt of the detected landmark 8 cannot be allowed, the position deviation ΔP is determined not to be allowable.

In step S12, the storage device 13 of the management device 10 that has acquired the ID of the landmark 8 of which the position deviation ΔP is not allowable updates the information about the landmark 8 stored in the own storage device. For example, the storage device 13 updates and stores information (position deviation information) about the position deviation ΔP being larger than the predetermined threshold ΔPc. This position deviation information can be used as a predetermined flag for indicating that the position deviation ΔP is larger than the predetermined threshold ΔPc, for example. That is, the landmark 8 with an ID to which this predetermined flag is attached satisfies ΔP>ΔPc.

When the storage device 13 has acquired the ID of the landmark 8 of which the position deviation ΔP is not allowable, the management device 10 may display, in the display device illustrated in FIG. 2, occurrence of the unallowable position deviation ΔP, and the ID and the position of the landmark 8 thereof. In doing so, an administrator can promptly know the occurrence of the landmark 8 of which the position deviation ΔP is not allowable, and can easily recognize the position from the ID. Therefore, the administrator can promptly make arrangements to modify the landmark 8 of which the position deviation ΔP is not allowable. In doing so, the possibility that the dump truck 2 deviates from the traveling path and the conveying path HL determined in advance can be decreased.

In the present embodiment, the traveling control unit 20D of the dump truck 2 does not use the registration position corresponding to the landmark 8 of which the position deviation ΔP is not allowable, in causing the dump truck 2 to travel by the dead reckoning navigation. In doing so, the traveling control unit 20D can decrease the possibility that the dump truck 2 deviates from the traveling path and the conveying path HL determined in advance, when correcting the reckoned position with the position of the landmark 8. Further, the management system 1 obtains the position of the landmark 8 detected by the non-contact sensor 24 when the GPS normally functions based on the measurement result of the GPS. The management system 1 then compares the position of the landmark 8 obtained as described above and the registration position of the landmark 8 to obtain the position deviation ΔP thereof. As described above, the position of the landmark 8 detected by the non-contact sensor 24 is based on the measurement result when the GPS normally functions. Therefore, the management system 1 can obtain the position deviation ΔP with high accuracy.

Moving onto step S13, the processing device 12 of the management device 10 notifies the ID of the unusable landmark 8 to each of the dump trucks 2 operated in the mine through the communication system 9. In this case, the processing device 12 of the management device 10 notifies the ID to at least the dump truck 2 that is to detect the unusable landmark 8 from now. For example, in the example illustrated in FIG. 10, a dump truck 2a, of dump trucks 2a, 2b, and 2c traveling in the conveying path HL, detects the landmark 8 of which the position deviation ΔP is not allowable. Therefore, in the example illustrated in FIG. 10, the ID of the unusable landmark 8 is notified to at least the dump truck 2b traveling behind the dump truck 2a. The unusable landmark 8 is the landmark 8 of which the position deviation ΔP is determined not to be allowable in step S24.

The processing system 2S of the dump truck 2 that has received the ID of the unusable landmark 8 in step S26 rewrites and updates the information of the landmark 8 stored in the storage device 25 in step S21. To be specific, the storage device 25 of the processing system 2S rewrites the position of the landmark 8 corresponding to the received ID not to be used for correction of the reckoned position. In doing so, when the non-contact sensor 24 has detected the landmark 8 of the ID corresponding to the unusable landmark 8, the traveling control unit 20D does not use the position for correction of the reckoned position. The processing device 12 may notify the position information of the unusable landmark 8, instead of notifying the ID of the unusable landmark 8.

<Modification>

In the present embodiment, in causing the dump truck 2 to travel by the dead reckoning navigation, the registration position corresponding to the landmark 8 of which the position deviation ΔP is not allowable is not used. However, an actual position Pr of a landmark 8 of which position deviation ΔP is not allowable may be used. In this case, in step S25, a calculation unit 20C transmits the actual position Pr of the landmark 8 of which the position deviation ΔP is not allowable to a management device 10. The actual position Pr is a position of the landmark 8, which has been detected by a non-contact sensor 24 and obtained by a traveling control unit 20D in step S22.

In step S12, in updating position deviation information, a storage device 13 rewrites a registration position of the landmark 8 of which the position deviation ΔP is not allowable with the actual position Pr (absolute position). Next, in step S13, a processing device 12 of the management device 10 notifies the rewritten registration position to each of the dump trucks 2 operated in the mine through a communication system 9.

In step S26, a processing system 2S of the dump truck 2 that has received the rewritten registration position rewrites and updates information of the landmark 8 stored in a storage device 25 in step S21, with the rewritten registration position. When the non-contact sensor 24 has detected the landmark 8 of which the position deviation ΔP is not allowable, the traveling control unit 20D corrects a reckoned position using the actual position Pr. The traveling control unit 20D causes the dump truck 2 to travel by dead reckoning navigation using the rewritten registration position. In doing so, the registration position of the landmark 8 and the actual position Pr are matched, and thus deviation thereof is not caused. As a result, a decrease in a possibility that the dump truck 2 deviates from a traveling path and a conveying path HL determined in advance can be suppressed. Further, a decrease in productivity of the mine can be suppressed. Further, the present modification also has an advantage to suppress a decrease in the number of usable landmarks when the traveling control unit 20D corrects the reckoned position using the landmark 8.

As described above, the present embodiment and the modification have been described. However, the present embodiment is not limited by the above-described content. Further, the configuration elements of the embodiment include those easily conceived by a person skilled in the art, those substantially the same, and those within the scope of equivalents. Further, the above-described configuration elements can be appropriately combined. Further, various omissions, replacements, and changes of the configuration elements can be made without departing from the gist of the present embodiment.

For example, in the present embodiment and the modification, in step S25, the processing system 2S of the dump truck 2 has notified the ID of the unusable landmark 8 and the like through the communication system 9. However, the processing system 2S of the dump truck 2 that has detected the unallowable position deviation ΔP may update the information related to the landmark 8 in the own storage device 25 with the ID of the unusable landmark 8 and the like.

In the present embodiment and the modification, in step S13, the processing device 12 of the management device 10 has notified the ID of the unusable landmark 8 and the like to the dump trucks 2 operated in the mine through the communication system 9. However, the processing system 2S of the dump truck 2 that has detected the unallowable position deviation ΔP may notify the ID of the unusable landmark 8 and the like to other dump trucks through the communication system 9. At this time, the processing system 2S of the dump truck 2 that has detected the unallowable position deviation ΔP may update the information related to the landmark 8 in the own storage device 25, with the ID of the unusable landmark 8 and the like.

REFERENCE SIGNS LIST

1 MANAGEMENT SYSTEM
2, 2a, 2b, and 2c DUMP TRUCK

2S PROCESSING SYSTEM
3 VEHICLE
4 LOADING MACHINE
4 GPS SATELLITE
5 CONTROL FACILITY
7 LANDMARK
8R REFLECTING PORTION
9 COMMUNICATION SYSTEM
10 MANAGEMENT DEVICE
11 COMPUTER SYSTEM
12 PROCESSING DEVICE
12A DATA PROCESSING UNIT
12B TRAVELING PATH GENERATION UNIT
13 STORAGE DEVICE
13B DATABASE
18 WIRELESS COMMUNICATION DEVICE
20 PROCESSING DEVICE
20C CALCULATION UNIT
20D TRAVELING CONTROL UNIT
24 NON-CONTACT SENSOR
25 STORAGE DEVICE
25B DATABASE
26 GYRO SENSOR
27 SPEED SENSOR
28 WIRELESS COMMUNICATION DEVICE
29 POSITION DETECTION DEVICE
30 PROCESSING DEVICE
300 DETECTION REGION

The invention claimed is:

1. A mining machine management system comprising:
a detection unit mounted on a mining machine that travels in an unmanned manner in a mine in which a plurality of landmarks is installed while a reckoned position of the mining machine obtained by dead reckoning navigation is corrected using a position of the landmark, the detection unit being configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, the position deviation corresponding to an amount that the landmark has physically moved from the registration position which represents a prior known position of the landmark to a present position, wherein
the processing unit causes the mining machine to travel by the dead reckoning navigation without using the registration position corresponding to the landmark having the position deviation larger than a predetermined threshold.

2. A mining machine management system comprising:
a detection unit mounted on a mining machine that travels in an unmanned manner in a mine in which a plurality of landmarks is installed while a reckoned position of the mining machine obtained by dead reckoning navigation is corrected using a position of the landmark, the detection unit being configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, wherein
the processing unit corrects a current own position of the mining machine based on the position of the landmark obtained in advance and the position of the landmark detected by the detection unit to cause the mining machine to travel by dead reckoning navigation, and causes the mining machine to travel by the dead reckoning navigation without using the registration position corresponding to the landmark having the position deviation larger than a predetermined threshold.

3. The mining machine management system according to claim 1, wherein
the storage unit stores, when the position deviation obtained by the processing unit is larger than a predetermined threshold, information about the position deviation being larger than the predetermined threshold.

4. A mining machine management system comprising:
a detection unit mounted on a mining machine that travels in an unmanned manner in a mine in which a plurality of landmarks is installed while a reckoned position of the mining machine obtained by dead reckoning navigation is corrected using a position of the landmark, the detection unit being configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, wherein
the storage unit stores, when the position deviation obtained by the processing unit is larger than a predetermined threshold, information about the position deviation being larger than the predetermined threshold, and
the processing unit corrects a current own position of the mining machine based on the position of the landmark obtained in advance and the position of the landmark detected by the detection unit to cause the mining machine to travel by the dead reckoning navigation, and causes the mining machine to travel by the dead reckoning navigation without using the registration position corresponding to the landmark having the position deviation larger than the predetermined threshold.

5. A mining machine management system comprising:
a detection unit mounted on a mining machine that travels in an unmanned manner in a mine in which a plurality of landmarks is installed while a reckoned position of the mining machine obtained by dead reckoning navigation is corrected using a position of the landmark, the detection unit being configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, wherein
the storage unit rewrites, when the position deviation obtained by the processing unit is larger than a predetermined threshold, the registration position of the landmark with the position of the landmark obtained by the processing unit, and
the processing unit corrects a current own position of the mining machine based on the position of the landmark obtained in advance and the position of the landmark detected by the detection unit to cause the mining machine to travel by dead reckoning navigation, and causes the mining machine to travel by the dead reckoning navigation using the rewritten registration position.

6. A mining machine management system comprising:
a detection unit mounted on a mining machine that travels in an unmanned manner in a mine in which a plurality of landmarks is installed while a reckoned position of the mining machine obtained by dead reckoning navigation is corrected using a position of the landmark, the detection unit being configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, wherein
the processing unit transmits the obtained position of the landmark to the storage unit, wherein,
when the position deviation is larger than a predetermined threshold, information about the position deviation being larger than the predetermined threshold is stored in the storage unit, and the processing unit transmits the information to another mining machine operated in the mine.

7. A mining machine that travels in an unmanned manner in a mine in which a plurality of landmarks is installed while a reckoned position of the mining machine obtained by dead reckoning navigation is corrected using a position of the landmark, the mining machine comprising:
a detection unit configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, the position deviation corresponding to an amount that the landmark has physically moved from the registration position which represents a prior known position of the landmark to a present position, wherein
the processing unit causes the mining machine to travel by the dead reckoning navigation without using the registration position corresponding to the landmark having the position deviation larger than a predetermined threshold.

8. A mining machine that travels in an unmanned manner in a mine in which a plurality of landmarks is installed while a reckoned position of the mining machine obtained by dead reckoning navigation is corrected using a position of the landmark, the mining machine comprising:
a detection unit configured to detect the position of the landmark with respect to the mining machine in a non-contact manner;
an own position detection device mounted on the mining machine, the own position detection device being configured to obtain an own position of the mining machine;
a storage unit configured to store positions of the plurality of landmarks, the positions having been obtained in advance, as registration positions; and
a processing unit configured to obtain the position of the landmark detected by the detection unit from a detection result of the detection unit and the own position obtained by the own position detection device, and read the registration position corresponding to the landmark from the storage unit and obtain position deviation between the registration position and the position of the landmark, wherein
the processing unit corrects a current own position of the mining machine based on the position of the landmark obtained in advance and the position of the landmark detected by the detection unit to cause the mining machine to travel by dead reckoning navigation, and causes the mining machine to travel by the dead reckoning navigation without using the registration position corresponding to the landmark having the position deviation larger than a predetermined threshold.

9. The mining machine according to claim 7, wherein the storage unit stores, when the position deviation obtained by the processing unit is larger than a predetermined threshold, information about the position deviation being larger than the predetermined threshold.

10. A mining machine management method, in managing a mining machine that travels in an unmanned manner in a mine in which a plurality of landmarks is installed while a reckoned position of the mining machine obtained by dead reckoning navigation is corrected using a position of the landmark, the mining machine management method comprising:

detecting the position of the landmark with respect to the mining machine and an own position of the mining machine;

obtaining the position of the landmark from a detection result of the position of the landmark and the own position, and obtaining position deviation between a position of a landmark corresponding to the landmark, the position having been obtained in advance, and the obtained position of the landmark, the position deviation corresponding to an amount that the landmark has physically moved from the registration position which represents a prior known position of the landmark to a present position;

generating, when the obtained position deviation is larger than a predetermined threshold, information about the position deviation being larger than the predetermined threshold; and causing the mining machine to travel by the dead reckoning navigation without using the registration position corresponding to the landmark having the position deviation larger than a predetermined threshold.

* * * * *